United States Patent
Wilson et al.

(10) Patent No.: US 11,792,081 B2
(45) Date of Patent: Oct. 17, 2023

(54) MANAGING TELECOMMUNICATION NETWORK EVENT DATA

(71) Applicant: Telefonaktiebolaget LM Ericsson (publ), Stockholm (SE)

(72) Inventors: Daniel Wilson, Jackson, NJ (US); Kaushik Dey, Kolkata (IN); Abhishek Sarkar, Bengaluru (IN); Selim Ickin, Stocksund (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 315 days.

(21) Appl. No.: 17/432,168

(22) PCT Filed: Feb. 22, 2019

(86) PCT No.: PCT/EP2019/054466
§ 371 (c)(1),
(2) Date: Aug. 19, 2021

(87) PCT Pub. No.: WO2020/169211
PCT Pub. Date: Aug. 27, 2020

(65) Prior Publication Data
US 2022/0303188 A1 Sep. 22, 2022

(51) Int. Cl.
*H04L 41/142* (2022.01)
*G06F 18/22* (2023.01)
*G06F 18/23* (2023.01)

(52) U.S. Cl.
CPC ........... *H04L 41/142* (2013.01); *G06F 18/22* (2023.01); *G06F 18/23* (2023.01)

(58) Field of Classification Search
CPC ..... H04L 41/142; H04L 41/14; H04L 41/147; H04L 41/149; H04L 41/16; G06F 18/22; G06F 18/23
See application file for complete search history.

(56) References Cited

U.S. PATENT DOCUMENTS 6,556,991 B1 4/2003 Borkovsky
10,664,550 B1* 5/2020 Foxworthy ............. G06F 17/18
(Continued)

FOREIGN PATENT DOCUMENTS

WO 2015158377 A1 10/2015

OTHER PUBLICATIONS

International Search Report and Written Opinion dated Sep. 26, 2019 for International Application No. PCT/EP2019/054466 filed Feb. 22, 2019, consisting of 12-pages.

*Primary Examiner* — Jeong S Park
(74) *Attorney, Agent, or Firm* — Christopher & Weisberg, P.A.

(57) ABSTRACT

Managing network event data in a telecommunication network. The method includes obtaining a plurality of datasets having network event data associated with products provided by a different vendor, the network event data comprising a plurality of data instances representing a plurality of network event features. The method further comprises obtaining metadata describing the network event data in the datasets and generating feature description vectors from the obtained metadata, calculating a metric of the relation between network event features represented in the datasets and constructing a graph of the network event features represented in the datasets, with edges weighted according to the calculated metric, partitioning the graph into clusters by minimising an edge cut between network event features, labelling network event features in the cluster with a normalised network event feature index and inputting the labelled network event data to a model for making at least one of recommendations or predictions.

19 Claims, 15 Drawing Sheets

(56) References Cited

U.S. PATENT DOCUMENTS

| | | |
|---|---|---|
| 2003/0182296 A1 | 9/2003 | Sato et al. |
| 2012/0221498 A1 | 8/2012 | Kaszynski et al. |
| 2013/0097246 A1* | 4/2013 | Zifroni .................. H04W 4/029 |
| | | 709/204 |
| 2013/0254294 A1* | 9/2013 | Isaksson ............ G06Q 30/0251 |
| | | 709/204 |
| 2015/0142829 A1* | 5/2015 | Lee ........................ G06F 16/13 |
| | | 711/170 |
| 2016/0048770 A1 | 2/2016 | Thomas et al. |
| 2016/0378762 A1 | 12/2016 | Rohter |
| 2017/0060663 A1 | 3/2017 | Tee et al. |
| 2017/0061208 A1* | 3/2017 | Basu ........................ G06F 18/22 |
| 2017/0228658 A1 | 8/2017 | Lim |
| 2019/0286500 A1* | 9/2019 | Tucker ..................... G06F 9/542 |
| 2022/0263710 A1* | 8/2022 | Margalit ............... G06F 11/328 |

* cited by examiner

FIG. 6

MANAGING TELECOMMUNICATION NETWORK EVENT DATA

CROSS-REFERENCE TO RELATED APPLICATIONS

This application is a Submission Under 35 U.S.C. § 371 for U.S. National Stage Patent Application of International Application Number: PCT/EP2019/054466, filed Feb. 22, 2019 entitled "MANAGING TELECOMMUNICATION NETWORK EVENT DATA," the entirety of which is incorporated herein by reference.

TECHNICAL FIELD

The present disclosure relates to a method for managing network event data in a telecommunication network, wherein the network event data is associated with products provided by different vendors. The present disclosure also relates to a manager and to a computer program and a computer program product configured, when run on a computer to carry out a method for managing network event data in a telecommunication network.

BACKGROUND

Machine Learning provides a powerful tools for the prediction and detection of network problems, which in turn can drive the automation of problem prevention and resolution. However, considerable effort and cost is required to design and train a Machine Learning (ML) Application for a particular domain. FIG. 1 is a schematic representation of process flow 100 for problem detection in a network and Operating System 102 on the basis of a trained ML application. Referring to FIG. 1, the process flow collects data from the network at step 104 and then cleans the data a step 106. Features are then derived from the cleaned data at step 108. The derived features are input to the trained ML application at step 108 and are also used for initial training or for retraining of the model at step 110. The ML model produces predictions and/or recommendations, which are implemented at step 114. Determination of the relevant features, typically derived from the cleaned data, is a complex task which must be refined interactively through multiple cycles of design, training and testing of the ML Application.

Different product and service vendors for telecommunication networks generally use different metadata, such as column and tag names, data formats and standardizations. The step of cleaning obtained network data seeks to identify relevant data items, standardize names, and standardize formats and code sets. Feature derivation then either identifies cleaned data items as features, or may combine data items to generate features, sometimes using complex calculations combining multiple cleaned data items to generate a feature for input to a ML application. Here also, differences between vendors may exist in the formulas and cleaned data items used to generate features for consumption by the ML application. Owing to these differences between vendor data and features, many ML applications are unable to consume data from different vendors. Models designed and trained using vendor 1 (e.g. Ericsson) data will not understand data from vendor 2. Additionally, different products from the same vendor may also require specialised ML applications for producing particular insights relevant to a specific product. The need to develop multiple specialised ML applications to handle data from different vendors is thus a major driver of the cost and time requirements for developing a ML based approach to network management.

US 2012/221498 discloses a method for aggregating and normalizing data from different sources. However, the method replies upon normalisation on the basis of similarity to known data; the method thus requires supervision, which is largely impractical when managing data of the scale and complexity found in telecommunication network management.

SUMMARY

It is an aim of the present disclosure to provide a method, apparatus and computer readable medium which at least partially address one or more of the challenges discussed above.

According to a first aspect of the present disclosure, there is provided a method for managing network event data in a telecommunication network, wherein the network event data is associated with products provided by different vendors. The method comprises obtaining a plurality of datasets, wherein each dataset comprises network event data associated with products provided by a single vendor, and wherein each dataset comprises a plurality of data instances representing a plurality of network event features. The method further comprises obtaining metadata describing the network event data in the datasets and, for individual network event features represented in the datasets, generating a feature description vector from the obtained metadata. The method further comprises calculating, on the basis of the generated feature description vectors, a metric of the relation between network event features represented in the datasets and constructing a graph of the network event features represented in the datasets, wherein edges between the network event features are weighted according to the calculated metric. The method further comprises partitioning the graph into clusters by minimising an edge cut between network event features and, for individual clusters in the graph, labelling network event features in the cluster with a normalised network event feature index, which index is unique to the cluster and corresponds to a specific normalised network event feature. The method further comprises inputting the network event data representing the labelled network event features to a model for making at least one of recommendations or predictions based on input data representing normalised network event features.

According to examples of the present disclosure, a plurality of datasets may comprise at least two datasets. According to examples of the present disclosure, data associated with a product may comprise data describing the product, data generated by or in connection with that product, data generated by an entity using the product, etc. A product may be hardware, software and/or some combination thereof.

According to examples of the present disclosure, obtaining metadata describing the network event data in the datasets may comprise, for a column of network data instances representing a network event feature, at least one of determining a classification of the data instances in the column, wherein the classification comprises at least one of categorical data, continuous numerical data, discrete numerical data, determining a data type of the data instances in the column, determining a granularity of the data instances in the column and/or generating a statistical representation of the data instances in the column.

According to examples of the present disclosure, a data type may be string, float, integer, timestamp etc.

According to examples of the present disclosure, generating a statistical representation of the data instances in the column may comprise generating at least one of a distribution of the data instances in the column, or a count of the number of data instances in the column.

According to examples of the present disclosure, generating a statistical representation of the data instances in the column may comprise, for a column of numerical data instances, calculating at least one of, maximum value, minimum value, standard deviation, percentiles, mean value, medial value and/or mode value of the data instances in the column.

According to examples of the present disclosure, generating a statistical representation of the data instances in the column may comprise, for a column of string data instances, calculating at least one of, maximum string length, minimum string length, mean string length and/or median string length of the data instances in the column.

According to examples of the present disclosure, generating a statistical representation of the data instances in the column may comprise, for a column of timestamp data instances, calculating the distribution of the data instances with respect to the timestamps.

According to examples of the present disclosure, generating a statistical representation of the data instances in the column may comprise, for a column of non-string data instances, converting the data instances to data type string, and performing the steps of an example described above.

According to examples of the present disclosure, for individual network event features represented in the datasets, generating a feature description vector from the obtained metadata may comprise selecting at least some of the obtained metadata, and writing the selected metadata into a feature description vector.

According to examples of the present disclosure, any of the obtained metadata items discussed in the preceding examples may be selected and written in to the feature description vector.

According to examples of the present disclosure, calculating, on the basis of the generated feature description vectors, a metric of the relation between network event features represented in the datasets may comprise computing a pairwise similarity between the feature description vectors of network event features represented in the datasets.

According to examples of the present disclosure, computing a pairwise similarity between the network event features represented in the datasets may comprise computing the exponential Chi-squared kernel in a pairwise manner for the feature description vectors of network event features represented in the datasets.

According to examples of the present disclosure, calculating, on the basis of the generated feature description vectors, a metric of the relation between network event features represented in the datasets may comprise computing a Euclidean distance between the feature description vectors of network event features represented in the datasets.

According to examples of the present disclosure, the Euclidean distance may be an n-dimensional space Euclidean distance, in which n is equal to the number of metadata items selected and written in to the feature description vector.

According to examples of the present disclosure, the method may further comprise filtering pairs of network event features represented in the datasets on the basis of the calculated metric, and constructing a graph of the network event features represented in the datasets may comprise forming an edge between a pair of network event features if the pair of network event features has been maintained after filtering.

According to examples of the present disclosure, filtering may comprise discarding pairs of features having a calculated metric value below a threshold.

According to examples of the present disclosure, the method may further comprise removing edges from the constructed graph according to a criterion before partitioning the graph into clusters.

According to examples of the present disclosure, the criterion may comprise at least one of, for a network event feature, maintaining only the K strongest weighted edges to other network event features, or maintaining only those edges over a threshold value.

According to examples of the present disclosure, the value of K may be chosen as a function of the number of vendors for which datasets have been obtained. For example, to obtain clusters containing only identical features from across different vendors, the value of K may be chosen to be equal to the number of vendors for which datasets have been obtained. To obtain clusters containing identical and related features from across different vendors, the value of K may be chosen to be greater than the number of vendors for which datasets have been obtained.

According to examples of the present disclosure, partitioning the graph into clusters by minimising an edge cut between network event features may comprise minimising the sum of the edge weights between clusters.

According to examples of the present disclosure, the size of the clusters may be fixed according to whether the clusters are to contain only identical features from across different vendors (cluster size equal to the number of vendors for which datasets have been obtained) or to contain identical and related features from across different vendors (cluster size greater than the number of vendors for which datasets have been obtained).

According to examples of the present disclosure, partitioning the graph into clusters by minimising an edge cut between network event features may comprise calculating the ratio of variances of a pair of network event features joined by an edge, calculating a combined measure for edges in the graph as a combination of the edge weight and an inverse of the ratio of variances, and minimising the sum of the combined measures between clusters.

According to examples of the present disclosure, the combination may be addition or multiplication.

According to examples of the present disclosure, the method may further comprise aggregating clusters based on at least one of Relative Interconnectivity or Relative Closeness before labelling network event features.

According to examples of the present disclosure, Relative Interconnectivity may be calculated according to:

$$RI(C_i, C_j) = \frac{|EC(C_i, C_j)|}{\frac{|EC(C_i)| + |EC(C_j)|}{2}}$$

where:

$EC(C_i, C_j)$ is the sum of the edge weights between clusters i and j; and $EC(C_i)$ is the sum of the edge weights between $C_i$ and all other clusters.

According to examples of the present disclosure, Relative Closeness may be calculated according to:

$$RC(C_i, C_j) = \frac{SEC(C_i, C_j)}{\frac{|C_i|}{|C_i|+|C_j|}SEC(C_i) + \frac{|C_j|}{|C_i|+|C_j|}SEC(C_j)}$$

where:
$SEC(C_i, C_j)$ is the average weight of the edges that connect vertices in Ci to vertices in Cj
$SEC(C_i)$ is the average weights of the edges that belong in the min-cut bisector of clusters Ci
$|C_i|$ is the number of edges that connect the vertices in cluster Ci According to examples of the present disclosure, the method may further comprise determining whether the clusters are complete, and aggregating clusters based on at least one of Relative Interconnectivity or Relative Closeness before labelling network event features if the clusters are not complete.

According to examples of the present disclosure, determining whether the clusters are complete may comprise determining whether, for a normalised network event feature, all network event features across different vendors that correspond to the normalised network event feature are contained in the same cluster. According to examples of the present disclosure, the method may further comprise sending the data for an additional manual check on the clustering, and possible manual revision of the clusters, after aggregation.

According to examples of the present disclosure, the method may further comprise combining data instances from different clusters to generate compound normalised features and inputting the compound normalised features to the model.

According to examples of the present disclosure, combining may comprise computing a Key Performance Indicator (KPI) according to a rule applicable to data from one or more vendors.

According to examples of the present disclosure, the method may further comprise forwarding network event data representing network event features that have not been labelled for manual labelling of the network event features with a normalised network event feature index.

According to examples of the present disclosure, the method may further comprise forwarding network event data representing labelled network event features for manual checking of the clustering.

According to examples of the present disclosure, the method may further comprise updating at least one of metadata that is obtained, generation of the feature description vector from the obtained metadata, calculation of the metric of the relation between network event features represented in the datasets, filtering on the basis of the metric, removal of edges from the constructed graph, partitioning the graph into clusters and/or aggregation of clusters on the basis of feedback from the manual labelling or checking.

According to examples of the present disclosure, the method may further comprise updating at least one of metadata that is obtained, generation of the feature description vector from the obtained metadata, calculation of the metric of the relation between network event features represented in the datasets, filtering on the basis of the metric, removal of edges from the constructed graph, partitioning the graph into clusters and/or aggregation of clusters on the basis of performance of the model.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a manager for managing network event data in a telecommunication network, wherein the network event data is associated with products provided by different vendors. The manager comprises a processor and a memory, the memory containing instructions executable by the processor such that the manager is operable to obtain a plurality of datasets, wherein each dataset comprises network event data associated with products provided by a single vendor, and wherein each dataset comprises a plurality of data instances representing a plurality of network event features. The manager is further operable to obtain metadata describing the network event data in the datasets, and, for individual network event features represented in the datasets, generate a feature description vector from the obtained metadata. The manager is further operable to calculate, on the basis of the generated feature description vectors, a metric of the relation between network event features represented in the datasets and to construct a graph of the network event features represented in the datasets, wherein edges between the network event features are weighted according to the calculated metric. The manager is further operable to partition the graph into clusters by minimising an edge cut between network event features and, for individual clusters in the graph, label network event features in the cluster with a normalised network event feature index, which index is unique to the cluster and corresponds to a specific normalised network event feature. The manager is further operable to input the network event data representing the labelled network event features to a model for making at least one of recommendations or predictions based on input data representing normalised network event features.

According to examples of the present disclosure, the manager may be further operable to carry out a method according to any one of the preceding aspects or examples of the present disclosure.

According to another aspect of the present disclosure, there is provided a manager for managing network event data in a telecommunication network, wherein the network event data is associated with products provided by different vendors. The manager adapted to obtain a plurality of datasets, wherein each dataset comprises network event data associated with products provided by a single vendor, and wherein each dataset comprises a plurality of data instances representing a plurality of network event features.

The manager is further adapted to obtain metadata describing the network event data in the datasets and, for individual network event features represented in the datasets, generate a feature description vector from the obtained metadata. The manager is further adapted to calculate, on the basis of the generated feature description vectors, a metric of the relation between network event features represented in the datasets, and to construct a graph of the network event features represented in the datasets, wherein edges between the network event features are weighted according to the calculated metric. The manager is further adapted to partition the graph into clusters by minimising an edge cut between network event features and, for individual clusters in the graph, label network event features in the cluster with a normalised network event feature index, which index is unique to the cluster and corresponds to a specific normalised network event feature. The manager is further adapted to input the network event data representing the labelled network event features to a model for making at least one of recommendations or predictions based on input data representing normalised network event features.

According to examples of the present disclosure, the manager may be further adapted to carry out a method according to any one of the preceding aspects or examples of the present disclosure.

BRIEF DESCRIPTION OF THE DRAWINGS

For a better understanding of the present invention, and to show more clearly how it may be carried into effect, reference will now be made, by way of example, to the following drawings, in which:

FIG. 6 illustrates a distance matrix based on Euclidean distance;

DETAILED DESCRIPTION

Aspects and examples of the present disclosure propose methods according to which the time and cost of supporting network management of multiple products provided by different vendors may be significantly reduced by enabling the reuse of ML Applications across multiple different vendors and/or vendor products. This may in some examples be achieved by methods of the present disclosure which facilitate the identification of common features.

Figure 1:
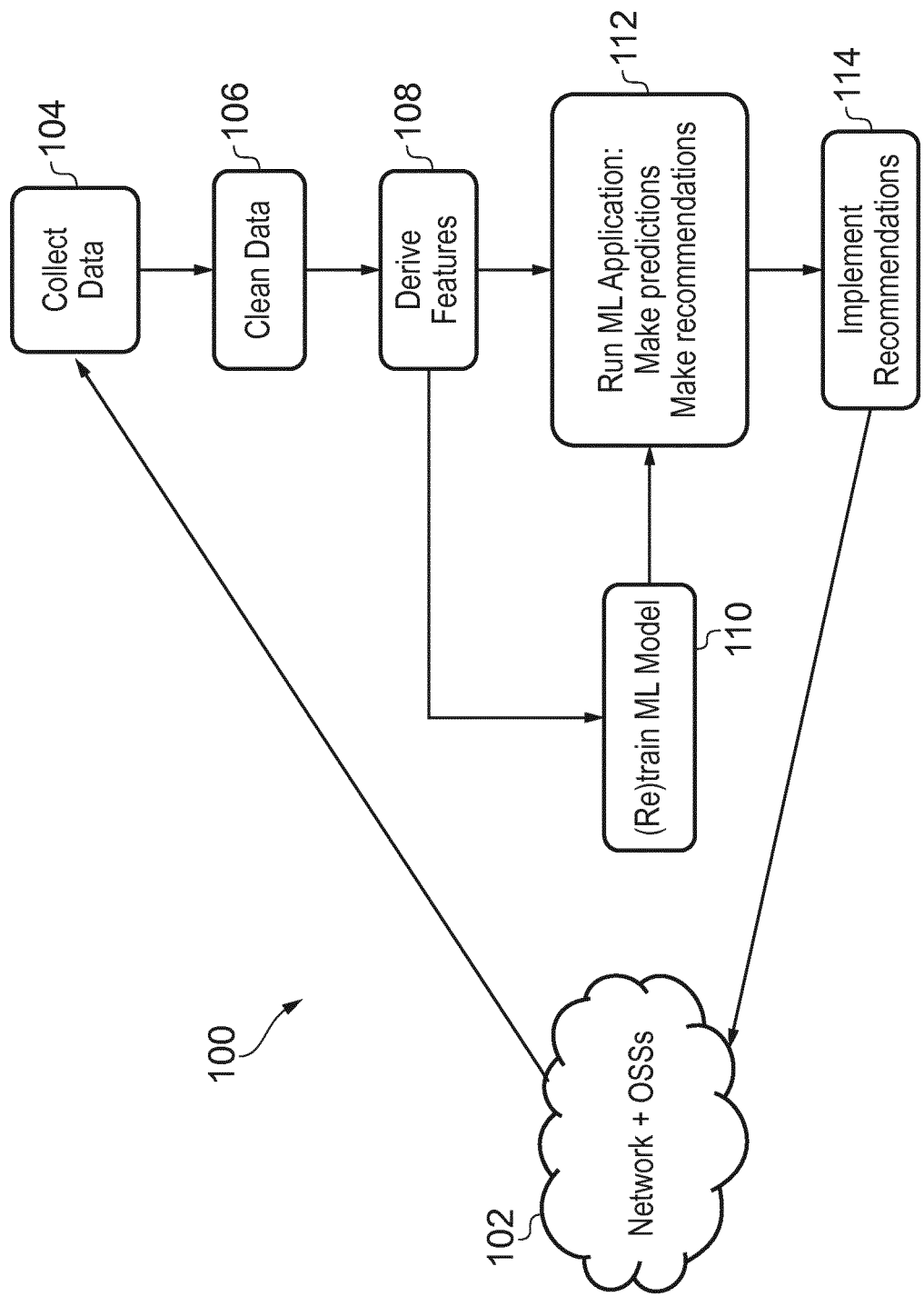
FIG. 1 is a schematic representation of process flow for problem detection.
Figure 2:
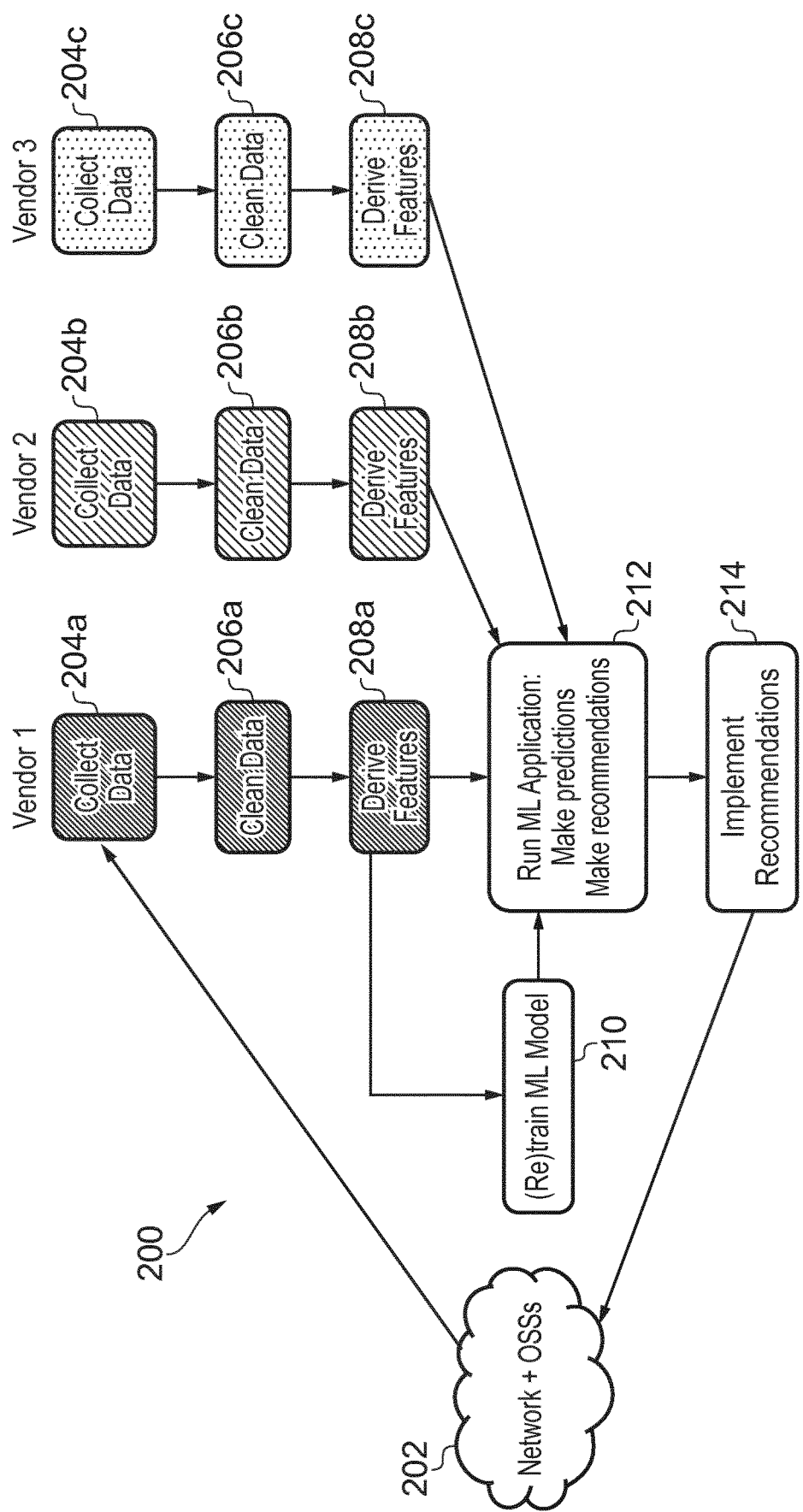
FIG. 2 is a schematic representation of a modified process flow for problem detection.

Examples of the present disclosure propose that for vendor products supporting similar functions there may exist a set of common features that can be derived from each vendor's data. This is represented visually in the process flow 200 of FIG. 2, which illustrates how the process flow of FIG. 1 may be modified, with dedicated collection 204a, 204b, 204c, cleaning 206a, 206b, 206c and feature derivation 208a, 208b, 208c steps for each vendor. The derived features are then input to a single shared ML application in step 212 and used to train that application in step 210, with the application making recommendations that are implemented in step 214. Example methods according to the present disclosure propose to achieve the data cleaning and feature derivation steps in a single automated process, according to which common data items between vendors can be discovered and input to a shared ML application.

Figure 3:
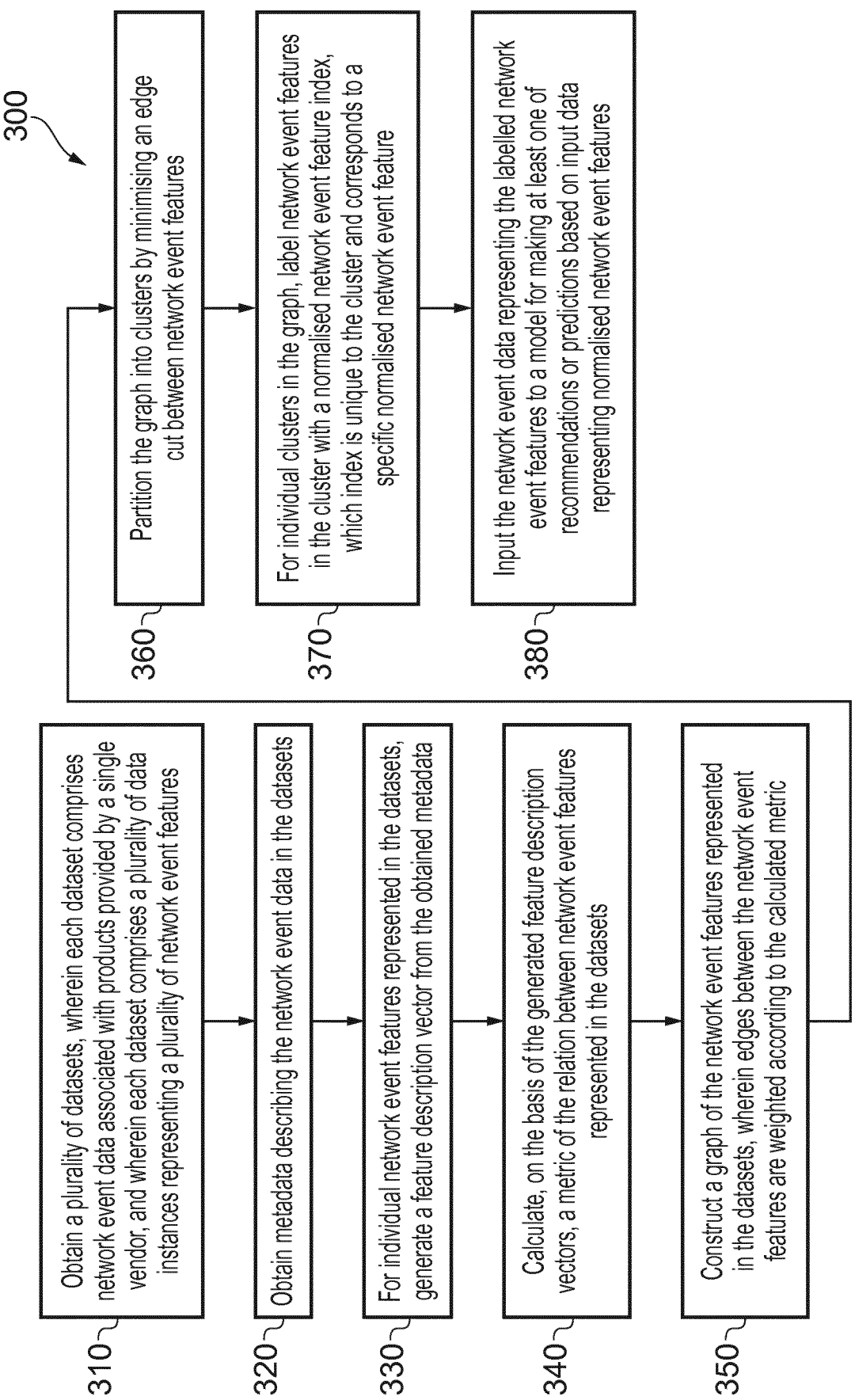
FIG. 3 is a flow chart illustrating process steps in a method for managing network event data in a telecommunication network.

FIG. 3 is a flow chart illustrating process steps in a method 300 for managing network event data in a telecommunication network, wherein the network event data is associated with products provided by different vendors. The method may be performed by a manager which may be a physical node or a Virtualised Network Function, for example running in a cloud deployment. Referring to FIG. 3, in a first step 310, the method comprises obtaining a plurality of datasets, wherein each dataset comprises network event data associated with products provided by a single vendor, and wherein each dataset comprises a plurality of data instances representing a plurality of network event features. In step 320, the method comprises obtaining metadata describing the network event data in the datasets and, in step 330, the method comprises, for individual network event features represented in the datasets, generating a feature description vector from the obtained metadata. The method then comprises, in step 340, calculating, on the basis of the generated feature description vectors, a metric of the relation between network event features represented in the datasets and, in step 350, constructing a graph of the network event features represented in the datasets, wherein edges between the network event features are weighted according to the calculated metric. In step 360, the method comprises partitioning the graph into clusters by minimising an edge cut between network event features and in step 370 the method comprises, for individual clusters in the graph, labelling network event features in the cluster with a normalised network event feature index, which index is unique to the cluster and corresponds to a specific normalised network event feature. In step 380, the method comprises inputting the network event data representing the labelled network event features to a model for making at least one of recommendations or predictions based on input data representing normalised network event features.

Figure 4:
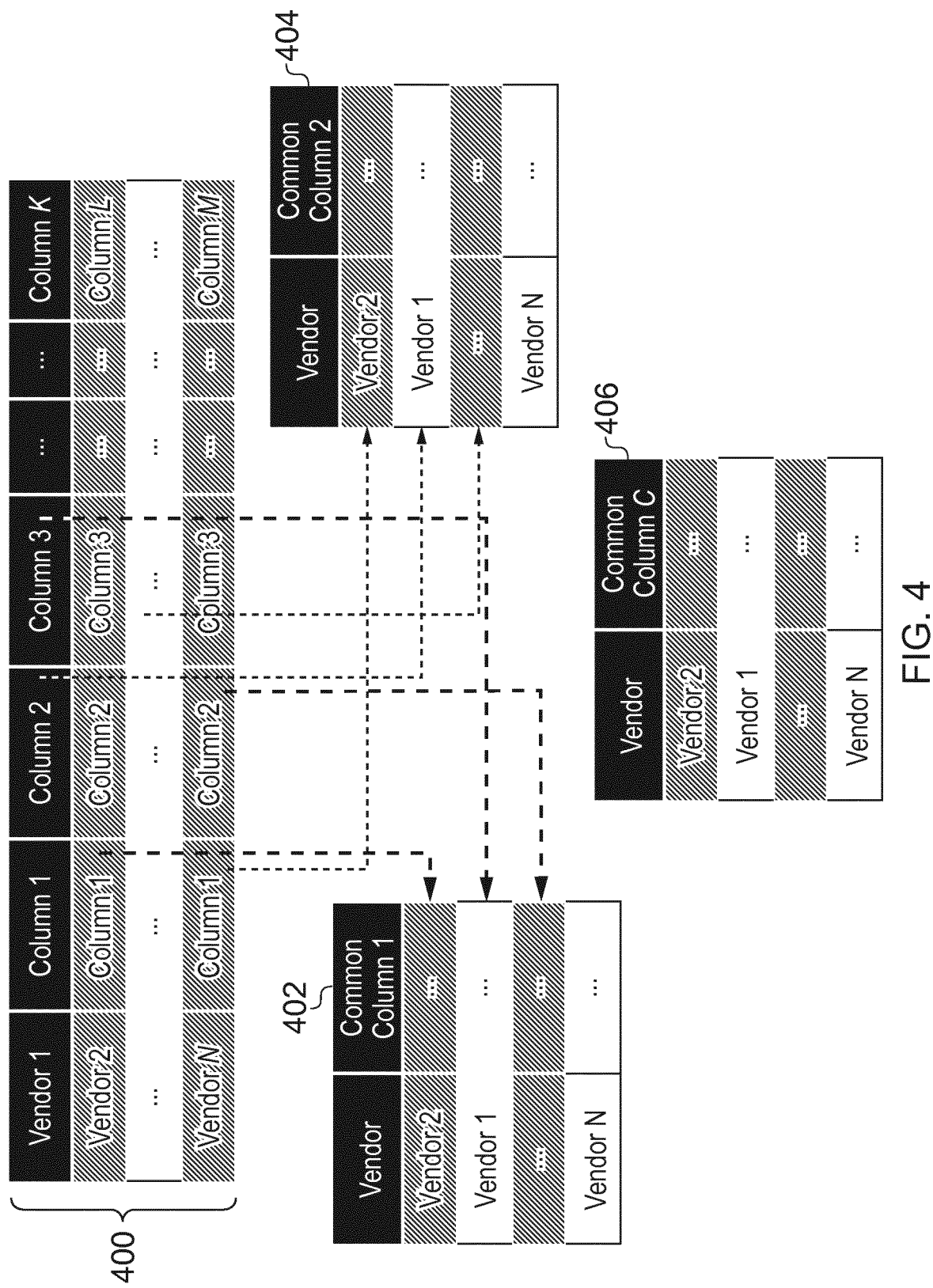
FIG. 4 illustrates grouping of columns in network data from different vendors.

As discussed above, identifying columns and tags in data from different vendors that contain similar information can be challenging when the column names or the description of the dataset are not the same for different vendors. FIG. 4 provides an example illustration of how such columns and tags may be identified and grouped according to examples of the present disclosure. Referring to FIG. 4, data for N vendors is represented, each vendor's data comprising a plurality of columns of individual data items. By virtue of methods according to the present disclosure, this multi-vendor data may be managed into new combined columns 402, 404, 406, in which data containing similar information from different vendors is grouped together.

As illustrated in FIG. 4, according to examples of the present disclosure, Column 3 from Vendor 1, Column 1 from Vendor 2, and Column 2 from Vendor N may all be found to contain similar or the same information, and may thus be grouped together into new combined column 402. Similarly, Column 2 from Vendor 1, Column 3 from another Vendor, and Column 1 from Vendor N are found to contain similar or the same information and so are grouped into new combined column 404. Other columns from the different vendors may be grouped to form combined column 406 etc. The combined columns may be identified as features, or may be further processed to generate a feature vector, and then input to a model.

FIGS. 5a to 5d show a flow chart illustrating process steps in another example of method 500 for managing network event data in a telecommunication network, wherein the network event data is associated with products provided by different vendors. The steps of the method 500 illustrate one way in which the steps of the method 300 may be implemented and supplemented in order to achieve the above discussed and additional functionality. As for the method 300 of FIG. 3 above, the method 500 may be performed by a manager which may be a physical node or a Virtualised Network Function, for example running in a cloud deployment. The following discussion of FIG. 5 assumes, for the purposes of illustration, that the method is performed by a manager.

Figure 5A:
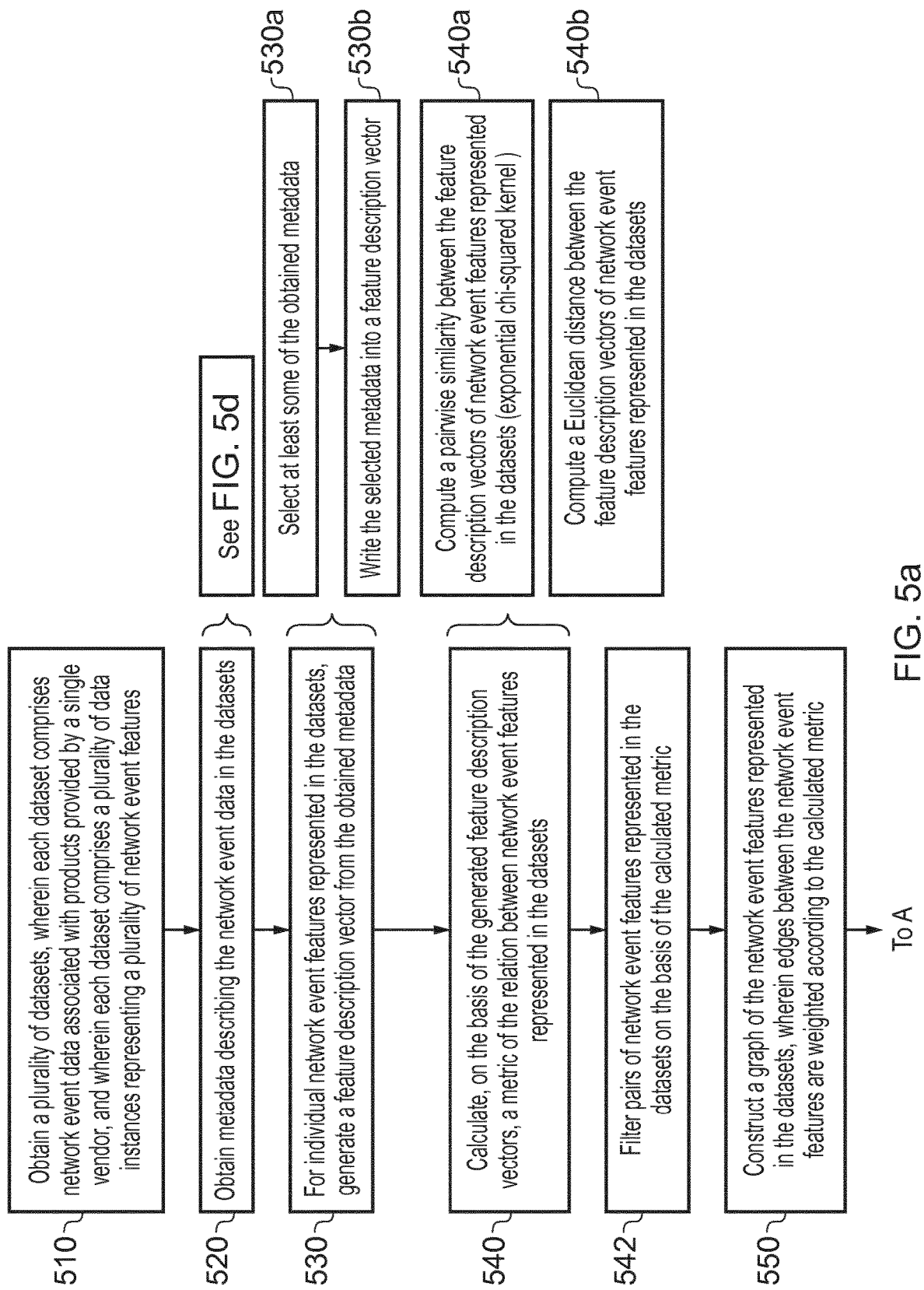
FIGS. 5a to 5d show a flow chart illustrating process steps in another example of method for managing network event data in a telecommunication network.

Referring to FIG. 5a, in a first step 510, the manager obtains a plurality of datasets, wherein each dataset comprises network event data associated with products provided by a single vendor, and wherein each dataset comprises a plurality of data instances representing a plurality of network event features. The plurality of data sets may be two or more datasets, and data associated with a product may comprise data describing the product, data generated by or in connection with that product, data generated by an entity using the product, etc. A product may be hardware, software and/or some combination thereof. It will be appreciated that the network event features represented by the data may be features of any kind or type of network event. This may include performance events, such as a performance measure exceeding or falling below a threshold, fault events relating to any incidence of fault in the network, environmental events recorded by the network and related to the environment in which the network is deployed, traffic events indicating particular traffic conditions within the network, etc.

Having obtained the plurality of datasets at step 510, the manager then obtains metadata describing the network event data in the datasets. Examples of such metadata and the sub steps that may be performed to obtain it, are provided below with reference to FIG. 5d.

Figure 5B:
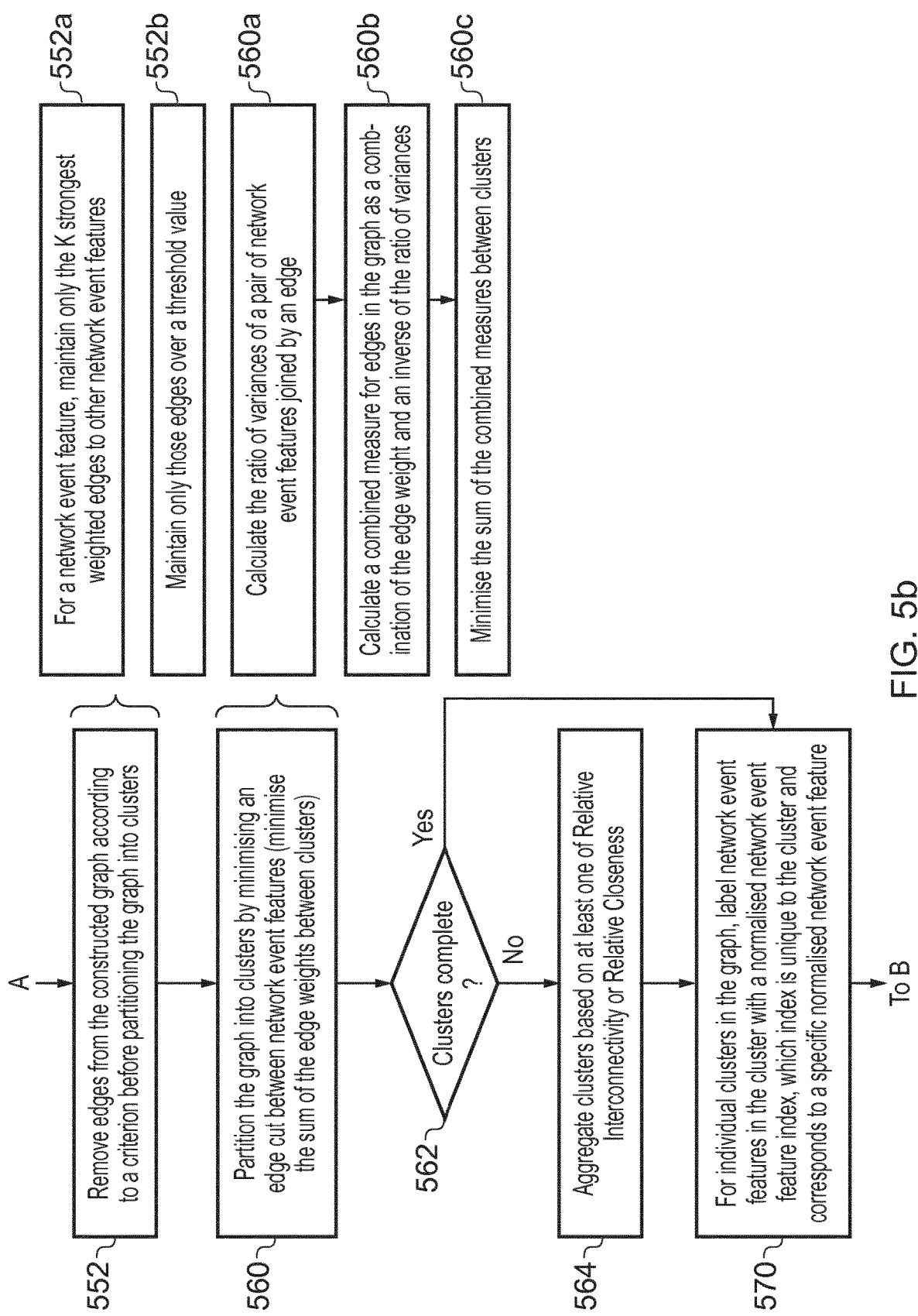
Figure 5C:
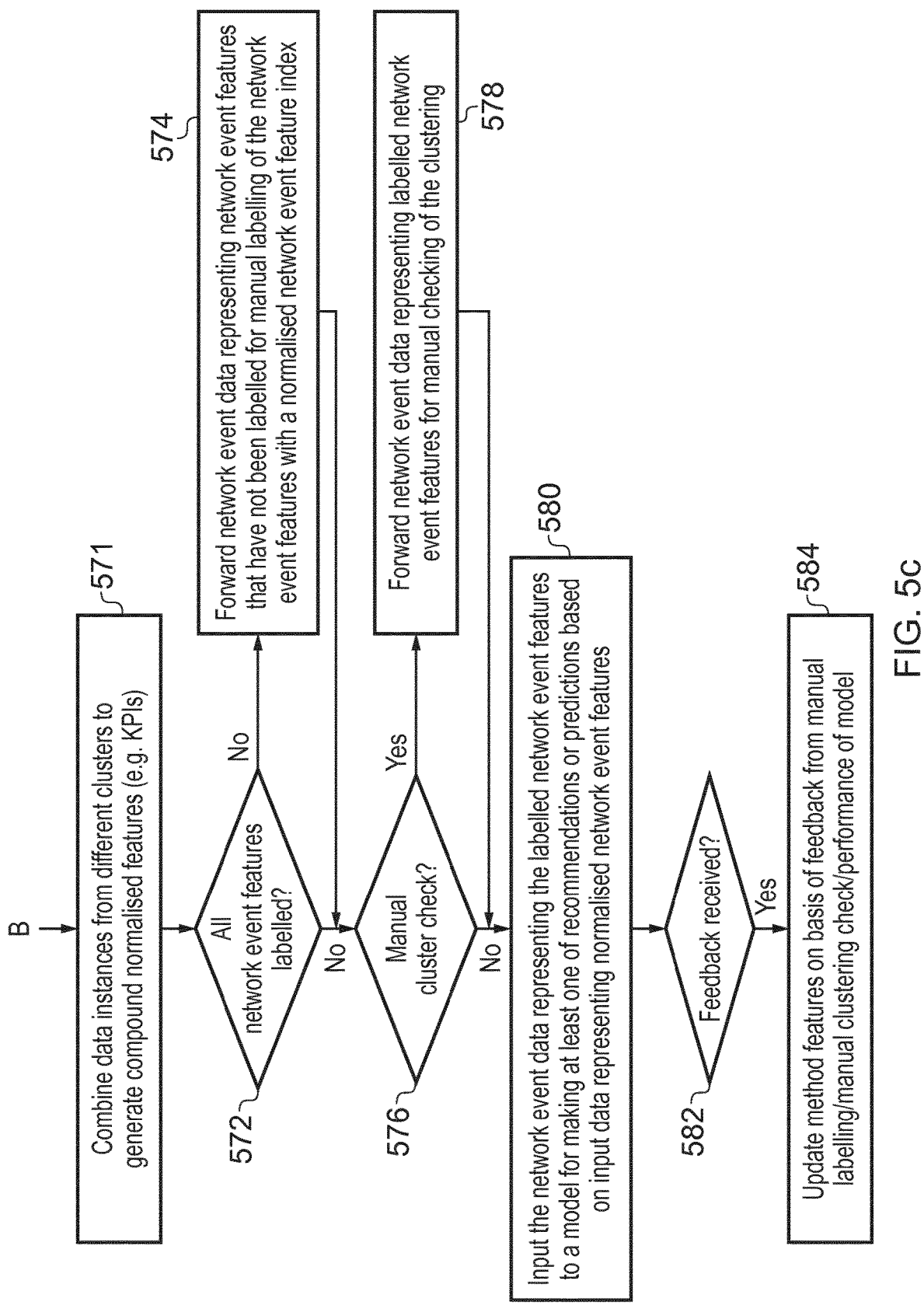
Figure 5D:
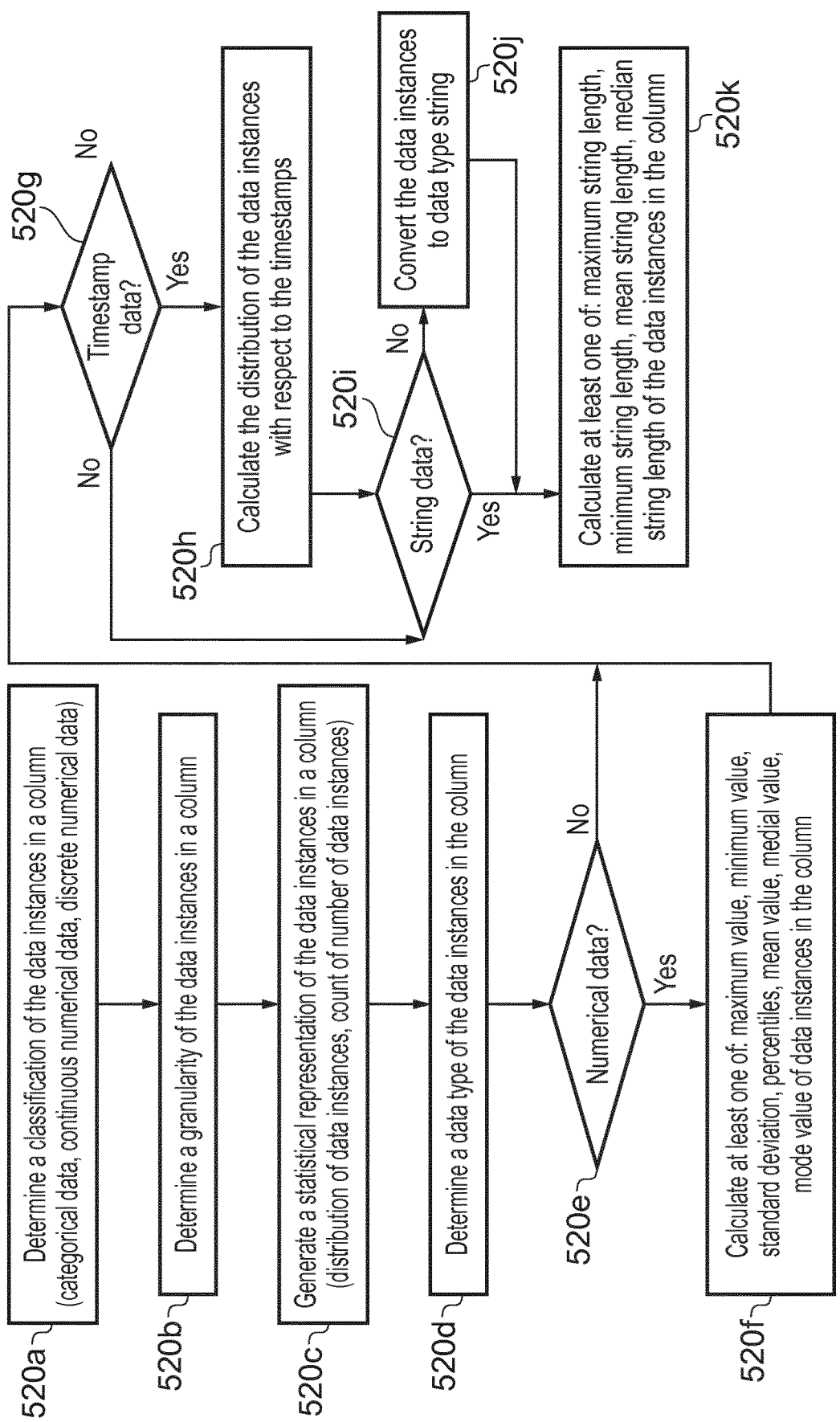

Referring to FIG. 5d, obtaining metadata at step 520 may first comprise, in step 520a, determining a classification of the data instances in the column, wherein the classification comprises at least one of categorical data, continuous numerical data and/or discrete numerical data. Obtaining metadata may further or alternatively comprise, at step 520b determining a granularity of the data instances in the column. Obtaining metadata may further or alternatively comprise, at step 520c, generating a statistical representation of the data instances in the column. This may comprise for example generating a distribution of the data instances in the column, or a count of the number of data instances in the column. Additional options for generating a statistical distribution of the data are discussed below, with reference to specific data types.

Obtaining metadata may further or alternatively comprise, at step 520d, determining a data type of the data instances in the column, the data type being for example string, float, integer, timestamp etc. Obtaining metadata may further comprise, at step 520e, checking whether the determined type of a column of data is numerical data. If the determined type is numerical data, generating a statistical representation of the data instances in the column may comprise, at step 520f, calculating at least one of maximum value, minimum value, standard deviation, percentiles, mean value, medial value and/or mode value of the data instances in the column.

Obtaining metadata may further comprise, at step 520g, checking whether the determined type of a column of data is timestamp data. If the determined type is timestamp data, generating a statistical representation of the data instances in the column may comprise, at step 520h, calculating the distribution of the data instances with respect to the timestamps.

Obtaining metadata may further comprise, at step 520i, checking whether the determined type of a column of data is string data. If the determined type is not string data, then obtaining metadata may comprise, at step 520, converting the data instances to data type string. Following conversion, of the determined data type is string, generating a statistical representation of the data instances in the column may comprise, calculating at least one of maximum string length, minimum string length, mean string length and/or median string length of the data instances in the column.

The metadata so obtained, including for example, classification, granularity, data type and various possible statistical distributions for individual columns of data, may be added to a file or list of metadata describing the network event data in the data sets.

Referring again to FIG. 5a, having obtained metadata describing the network event data in the datasets at step 520, the manager proceeds, for individual network event features represented in the datasets, to generate a feature description vector from the obtained metadata. As illustrated at 530a and 530b, this comprises, in one example, selecting at least some of the obtained metadata, and writing the selected metadata into a feature description vector. Any or all of the metadata items discussed above may be selected and written in to the feature description vector.

The manager them at step 540, calculates, on the basis of the generated feature description vectors, a metric of the relation between network event features represented in the datasets. This may comprise computing a pairwise similarity at 540a, such as a pairwise Chi-squared based similarity, between the feature description vectors of network event features represented in the datasets, or computing a Euclidean distance between the feature description vectors of network event features represented in the datasets at 540b. The Euclidean distance may be an n-dimensional space Euclidean distance, in which n is equal to the number of metadata items selected and written in to the feature description vector.

In step 550, the manager filters pairs of network event features represented in the datasets on the basis of the calculated metric, for example maintaining pairs of network event features having a value of the metric above a threshold value. In step 560, the manager constructs a graph of the network event features represented in the datasets, wherein edges between the network event features are weighted according to the calculated metric. Constructing a graph of the network event features represented in the datasets may comprises forming an edge between a pair of network event features if the pair of network event features has been maintained after filtering.

Referring now to FIG. 5b, the manager then removes edges from the constructed graph according to a criterion in step 522. In one example, as illustrated at 522a, the criterion comprises, for a network event feature, maintaining only the K strongest weighted edges to other network event features. A value of K may be chosen as a function of the number of vendors for which datasets have been obtained. For example, to obtain clusters containing only identical features from across different vendors, the value of K may be chosen to be equal to the number of vendors for which datasets have been obtained. To obtain clusters containing identical and related features from across different vendors, the value of K may be chosen to be greater than the number of vendors for which datasets have been obtained. In another example, illustrated at 522b, the criterion comprises maintaining only those edges having a metric value over a threshold value. The threshold value may be example be higher than that used for filtering the pairs of network event features in step 542. Alternatively, the filtering step 542 may be omitted, and the filtering may be applied via the threshold selection in the edge removal step 552. In another example, the edge removal step may be omitted, with any filtering applied during the filtering step 542 only.

In step 560, the manager partitions the graph into clusters by minimising an edge cut between network event features, which may comprise minimising the sum of the edge weights between clusters. In some examples of the method 500, the size of the clusters may be fixed according to whether the clusters are to contain only identical features from across different vendors (cluster size equal to the number of Vendors for which datasets have been obtained) or to contain identical and related features from across different vendors (cluster size greater than the number of Vendors for which datasets have been obtained).

As illustrated in FIG. 5b, in one example, partitioning the graph into clusters by minimising an edge cut between network event features comprises calculating the ratio of variances of a pair of network event features joined by an edge in step 560a, calculating a combined measure for edges in the graph as a combination of the edge weight and an inverse of the ratio of variances in step 560b, and minimising the sum of the combined measures between clusters in step 560c. The combination of the combined measure may be addition or multiplication.

In step 562, the manager checks whether or not the clusters are complete. This may comprise determining whether, for a normalised network event feature, all network event features across different vendors that correspond to the normalised network event feature are contained in the same cluster. If the clusters are complete, the manager proceeds to step 570. If the clusters are not complete, the manager aggregates clusters based on at least one of Relative Interconnectivity or Relative Closeness in step 564.

According to one example, Relative Interconnectivity is calculated according to:

$$RI(C_i, C_j) = \frac{|EC(C_i, C_j)|}{\frac{|EC(C_i)| + |EC(C_j)|}{2}}$$

where:
$EC(C_i, C_j)$ is the sum of the edge weights between clusters i and j; and
$EC(C_i)$ is the sum of the edge weights between $C_i$ and all other clusters.

According to another example, Relative Closeness is calculated according to:

$$RC(C_i, C_j) = \frac{SEC(C_i, C_j)}{\frac{|C_i|}{|C_i| + |C_j|}SEC(C_i) + \frac{|C_j|}{|C_i| + |C_j|}SEC(C_i)}$$

where:
$SEC(C_i, C_j)$ is the average weight of the edges that connect vertices in Ci to vertices in Cj
$SEC(C_i)$ is the average weights of the edges that belong in the min-cut bisector of clusters Ci
$|C_i|$ is the number of edges that connect the vertices in cluster Ci It will be appreciated that other formulas for calculating Relative Interconnectivity and Relative Closeness may be envisaged.

In some examples of the method 500, after aggregation, the manager may send the data for an additional check on the clustering, and possible manual revision of the clusters, for example by a suitable expert or Machine Learning engineer.

In step 570, for individual clusters in the graph, the manager labels network event features in the cluster with a normalised network event feature index, which index is unique to the cluster and corresponds to a specific normalised network event feature.

Referring now to FIG. 5c, in step 571, the manager combines data instances from different clusters to generate compound normalised features. This may for example comprise computing a KPI according to a rule applicable to data from one or more Vendors.

In step 572, the manager checks whether all network event features have been labelled. If this is not the case, the manager forwards network event data representing network event features that have not been labelled for manual labelling of the network event features with a normalised network event feature index in step 574. Once all network event features have been labelled, the manager checks at step 576 whether a manual cluster check is required or appropriate. If so, the manager forwards network event data representing labelled network event features for manual checking of the clustering in step 578.

If no manual cluster check is required, or once the manual cluster check has been completed, the manager inputs the network event data representing the labelled network event features to a model for making at least one of recommendations or predictions based on input data representing normalised network event features at step 580.

In step 582, the manager checks whether any feedback has been received. This may be feedback from the manual check on clustering, from the manual labelling, or from performance of the model itself, for example following implementation of recommendations from the model and appropriate follow-up monitoring, or from comparing predictions provided by the model to actual outcomes.

If feedback has been received, the manager proceeds to update method features on the basis of this feedback at step 584. This updating may comprise updating any one or more of:
  the metadata that is obtained;
  the metadata that is selected and written in to the individual feature vectors;
  the process of generation of the feature description vector from the obtained metadata;
  the calculation of the metric of the relation between network event features represented in the datasets;
  the filtering performed on the basis of the metric (including for example threshold values);

the removal of edges from the constructed graph (including for example selection of K value or threshold values);

the partitioning of the graph into clusters; and/or the aggregation of clusters.

The updating step 584 may enable the method to evolve in light of the provided feedback, adjusting the various parameters of the method to improve the quality of the network event feature selection, clustering and labelling for input to the recommendation/prediction model.

The following description provides some additional discussion of how step 540 of calculating a metric of the relation between network event features represented in the data sets may be carried out. The example illustrated below uses pairwise similarity.

Metric calculation using pairwise similarity:

Suppose there are N datasets from N vendors, and each dataset contains a number of feature columns. Then, in one example of the present disclosure, N similarity vectors may be obtained from the N different vendor datasets and input to a pairwise Chi-squared test as follows:

Convert each value to data type String.

Compute the length of the strings.

return(len(str(text)))

Compute the mean, median, minimum, maximum of the string values in each dataset such that each instance of the dataset appears as follows:

[Vendor n, feature index n, mean_string_length, median_string_length, minimum_string_length, maximum_string_length]

Compute the mean, median, minimum, and maximum of each column under each feature index for each vendor. Append this additional vector to the above vector such that each instance of the dataset appears as follows:

[Vendor n, feature index n, mean_string_length, median_string_length, minimum_string_length, maximum_string_length, mean_column, median_column, maximum_column, minimum_column]

Compute the exponential Chi-squared kernel in a pairwise manner for the above N vectors.

Filter in the pairs whose computed pairwise chi-squared values are larger than a threshold (e.g. 0.01)

The computed pairwise similarity may be used to construct a distance matrix representing the pairwise similarity between all of the columns of all of the datasets, as illustrated below with reference to an example metric of Euclidean distance.

The following description provides some additional discussion of an alternative example method for carrying out step 540, calculating an example Euclidean distance metric.

Suppose that the following data for 3 vendors is available, either in rectangular csv files or tagged xml/json files:

TABLE 1

| Vendor 1 | 5 Columns/Tags |
| Vendor 2 | 15 Columns/tags |
| Vendor 3 | 4 columns/tags |

Any column in any of the dataset may be represented by an array of descriptive measures, for example, percentile values at an increment of 10. These percentile values are referred to as aggregate_feature_1, aggregate_feature_2, etc.

TABLE 2

| | isNumeric | p10 | p20 | p30 | p50 | ... |
|---|---|---|---|---|---|---|
| column A | 1 | 2.5 | 2.6 | 3.1 | 4 | ... |
| column B | 1 | 1.5 | 1.1 | 1.1 | 1.1 | ... |

Assuming that three aggregate features are selected to represent each column in a data set, each column may be represented by metadata comprising a triplet of real numbers.

TABLE 3

| vendor | column | vendor_column | aggregate_feature_1 | aggregate_feature_2 | aggregate_feature_3 |
|---|---|---|---|---|---|
| V_1 | C_1 | V_1_C_1 | 1 | −0.61 | −0.30 |
| V_1 | C_2 | V_1_C_2 | 2 | 0.46 | 1.29 |
| V_1 | C_3 | V_1_C_3 | 1 | −0.87 | −0.75 |
| V_1 | C_4 | V_1_C_4 | 1 | −1.00 | −0.82 |
| V_1 | C_5 | V_1_C_5 | 3 | 0.60 | 0.55 |
| V_2 | C_1 | V_2_C_1 | 1 | 2.66 | −0.18 |
| V_2 | C_2 | V_2_C_2 | 1 | 3.27 | 0.56 |
| V_2 | C_3 | V_2_C_3 | 1 | −0.97 | −0.55 |
| V_2 | C_4 | V_2_C_4 | 3 | −1.57 | −0.40 |
| V_2 | C_5 | V_2_C_5 | 1 | 0.04 | −0.39 |
| V_2 | C_6 | V_2_C_6 | 1 | 0.66 | 0.46 |
| V_2 | C_7 | V_2_C_7 | 1 | −1.86 | −0.29 |
| V_2 | C_8 | V_2_C_8 | 1 | 0.12 | 1.38 |
| V_2 | C_9 | V_2_C_9 | 1 | 0.14 | 0.91 |
| V_2 | C_10 | V_2_C_10 | 1 | −0.34 | 0.61 |
| V_2 | C_11 | V_2_C_11 | 2 | 0.77 | 0.19 |
| V_2 | C_12 | V_2_C_12 | 1 | 0.01 | −1.11 |
| V_2 | C_13 | V_2_C_13 | 1 | −0.16 | 0.37 |
| V_2 | C_14 | V_2_C_14 | 1 | 0.65 | 2.06 |
| V_2 | C_15 | V_2_C_15 | 1 | 0.58 | −0.72 |
| V_3 | C_1 | V_3_C_1 | 1 | −1.82 | −0.26 |
| V_3 | C_2 | V_3_C_2 | 3 | −1.43 | 1.94 |
| V_3 | C_3 | V_3_C_3 | 1 | −2.28 | −0.11 |
| V_3 | C_4 | V_3_C_4 | 2 | 1.60 | 1.28 |

Table 3 provides an illustrative summary data that can be constructed. Additional rows may be added to this dataset based on bootstrapped samples from the original datasets.

Figure 6:
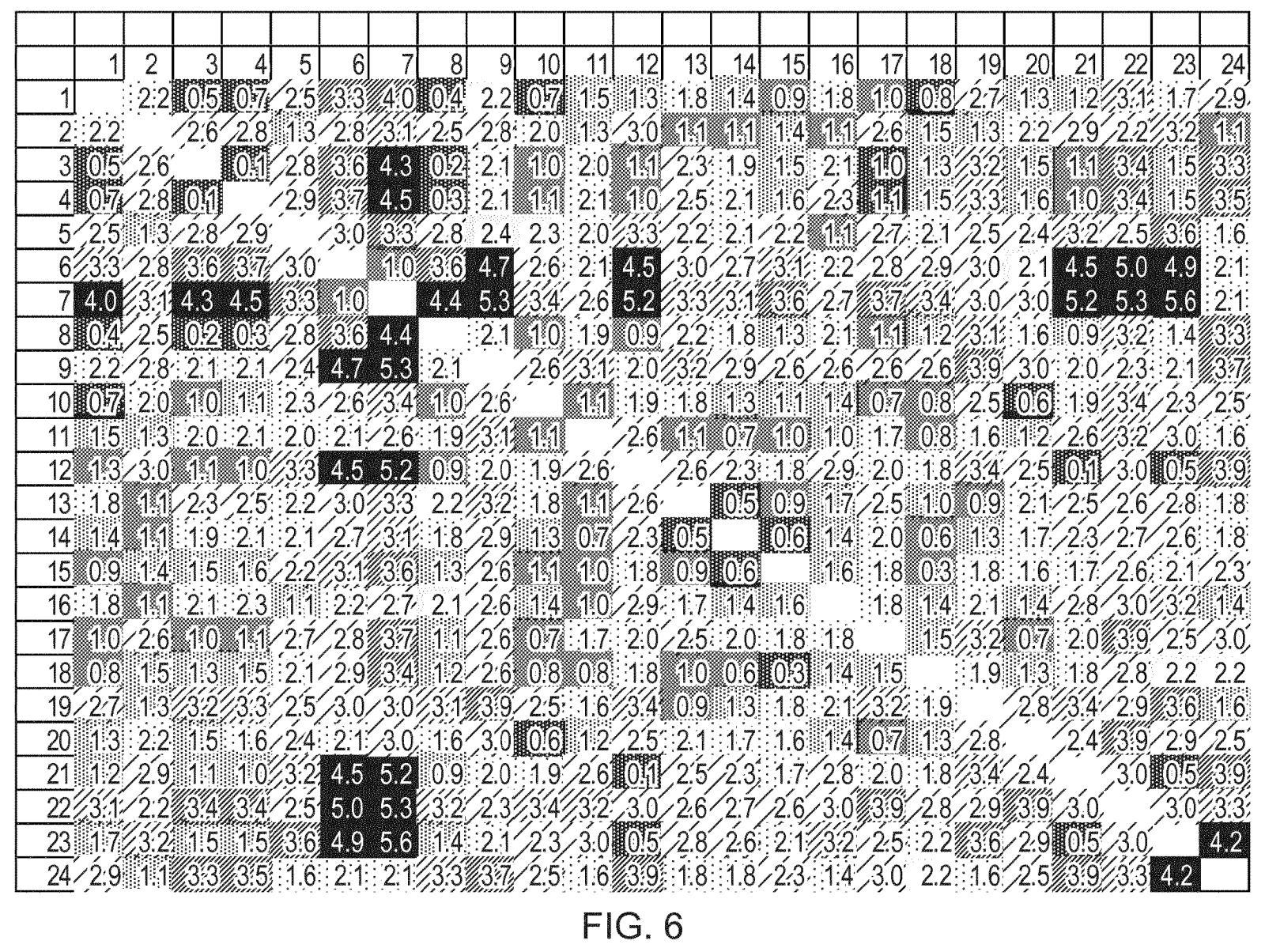

From Table 3, a distance matrix is computed using Euclidean distance. The distance matrix is illustrated in FIG. 6, with the 24 row and columns representing the 5 columns of Vendor 1, the 15 columns of Vendor 2 and the 4 columns of Vendor 3. The entries of the distance matrix are the calculated values of Euclidean distance between the columns, on the basis of the aggregate feature illustrated above. It will be appreciated that a similar distance matrix may be constructed on the basis of the Chi-squared pairwise similarity discussed above.

Examples of factors that may be used to compute pairwise similarity or Euclidean distance for columns of vendor data include the following:

Data type of each column (String, float, integer, or timestamp)

Distribution of the data under each column

Granularity of the data under each column

The data under each column being categorical, discrete, or continuous

Unique number of elements under the column

If the data type under the column is numeric:

Descriptive statistics of the column including minimum, maximum, standard deviation, percentiles, mean, median, mod If the data type under the column is string:
The mean, min, max, string lengths of the values
If the data type under the column is timestamp:
Get the distribution of the data with respect to those timestamps.
How much data is present under a particular day/hour/minute. This information would give an indication about the type of sensor collecting the data and hence an indication of the nature of the data.

The following description provides additional discussion of how steps 550 to 564 may be carried out, using the example metric of Euclidean distance described above.

Figure 7:
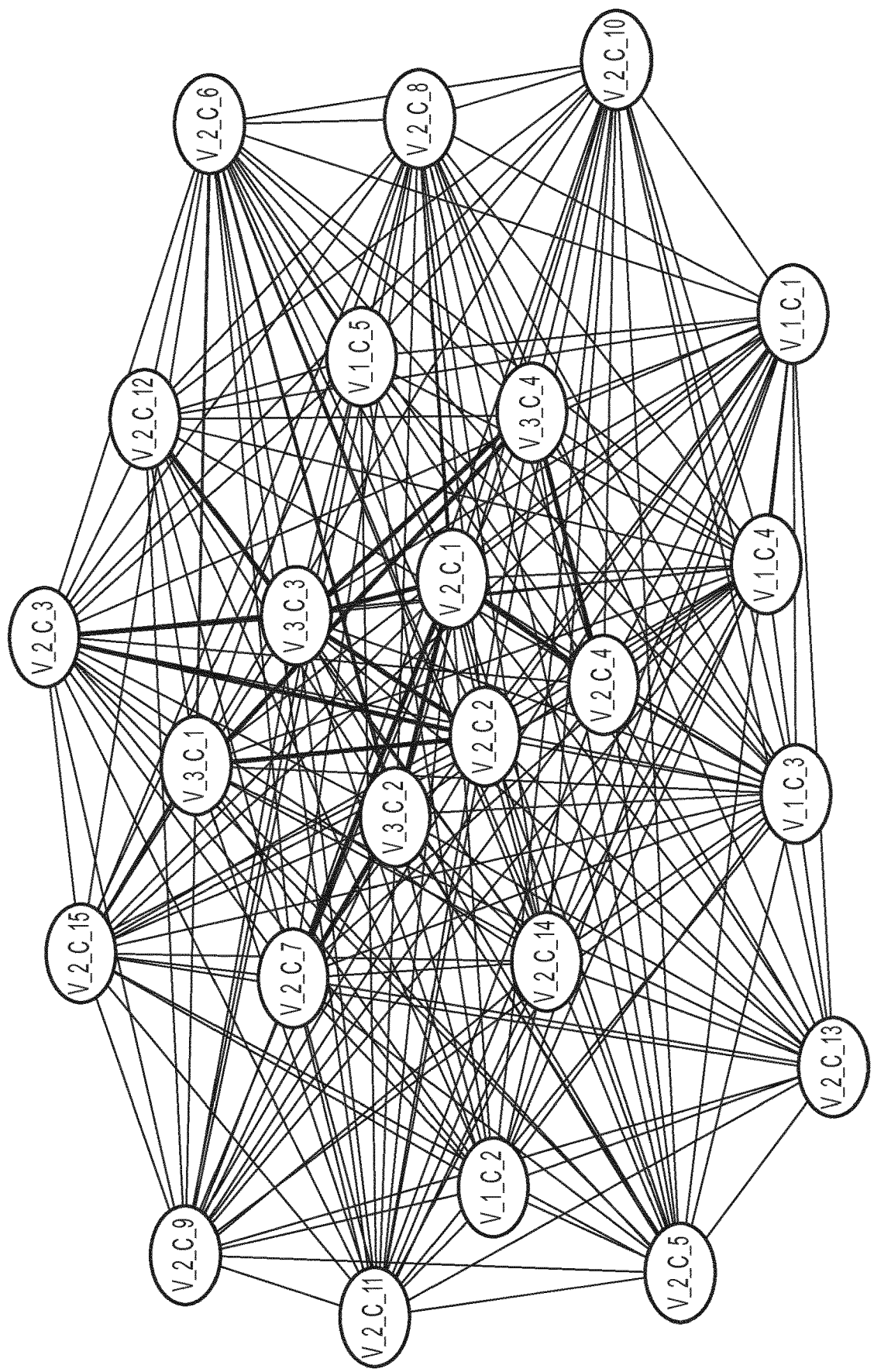
FIG. 7 illustrates a graph based on Euclidean distance.

A densely connected graph G may be plotted using the distance matrix, based either on Euclidean distance or the pairwise similarity. A sample graph based on Euclidean distance is illustrated in FIG. 7. Each vertex represents a column of data from a vendor. The thicker the edge between two vertices, the closer they are in an n-d Euclidean space. The dimension of this Euclidean space is same as the number of features with which a single column is represented.

A sparse graph Gs may then be created from the dense graph G by connecting each node only to its K nearest neighbours or based on a fixed threshold value according to which the thinnest edges are dropped on the basis of some criteria.

The sparse graph Gs is then partitioned to create clusters. This clustering may be based on minimizing an edge cut. As each edge cut will represent the similarity between clusters of vertices, minimizing the edge cut will result in identifying clusters whose vertices are most similar and thus probably belonging to the same attribute but from different vendor elements. The edge cut between 2 clusters $C_i$ and $C_j$ is defined as the sum of the edge weights that go between the clusters and is denoted by $EC(C_i,C_j)$.

The F statistic may be used to inform the edge weights used for minimising an edge cut. The F-statistic is measured as the ratio of variances of two samples, in this case 2 vertices. If they represent the same element, then they should have a similar variance and the ratio would be close to 1. If they vary, then F value would exceed 1 by a significant value. After obtaining the F statistic, both the edge weight and the inverse of F may be used to obtain a combined measure (Additive or multiplicative) to perform the edge cut and thereby obtain clusters which would contain the same elements.

At this point check may be made to ensure that clusters are complete. This may in some examples comprise a visual or manual check. If clusters are complete, in that there is a good level of certainty that the same attributes across vendors have been grouped into unique clusters then the clustering process is complete. However, if the clusters are incomplete such that the same attribute is scattered across more than one cluster, then cluster aggregation may be performed. The aggregation process may bunch similar attributes across vendors into one single cluster. Following the aggregation process, there may be clusters that contain more than a single attribute. Such clusters may be subjected to a visual inspection to segregate them into clusters of unique attributes. These visual inspections should be very quick and easy as the clusters following agglomeration are likely to contain no more than two or three unique attributes.

Clusters may initially be aggregated based on their Relative Closeness and Relative Interconnectivity. Relative Interconnectivity is measured by absolute connectivity between two clusters (measured as the sum of weights of all edges between two clusters) divided by their individual internal interconnectivity (measured as the sum of weights of the edges which would partition the graph into two equal parts).

$$RI(C_i, C_j) = \frac{|EC(C_i, C_j)|}{\frac{|EC(C_i)| + |EC(C_j)|}{2}}$$

where:
$EC(C_i, C_j)$ is the sum of the edge weights between clusters i and j; and
$EC(C_i)$ is the sum of the edge weights between $C_i$ and all other clusters.

Relative Closeness is defined as the absolute closeness between the two clusters divided by individual closeness of the clusters. Absolute closeness between two clusters is measured as the similarity of the connected points between two clusters. As the edges themselves have been created through K Nearest Neighbours (KNN) clustering, the points are expected to have some natural affinity among themselves which may be exploited. Individual closeness of each cluster is defined as the average of the sum of edges connecting vertices within a cluster.

$$RC(C_i, C_j) = \frac{SEC(C_i, C_j)}{\frac{|C_i|}{|C_i| + |C_j|} SEC(C_i) + \frac{|C_j|}{|C_i| + |C_j|} SEC(C_i)}$$

where:
$SEC(C_i, C_j)$ is the average weight of the edges that connect vertices in Ci to vertices in Cj
$SEC(C_i)$ is the average weights of the edges that belong in the min-cut bisector of clusters Ci
$|C_i|$ is the number of edges that connect the vertices in cluster Ci The resultant clusters would group the same fields across vendors and the final clusters would group together similar rows which are probably related, thus adding value to any analysis to be done through human inspection.

The following description provides some additional discussion of how step 571 of combining data instances from different clusters to generate compound normalised features may be carried out.

Figure 8:
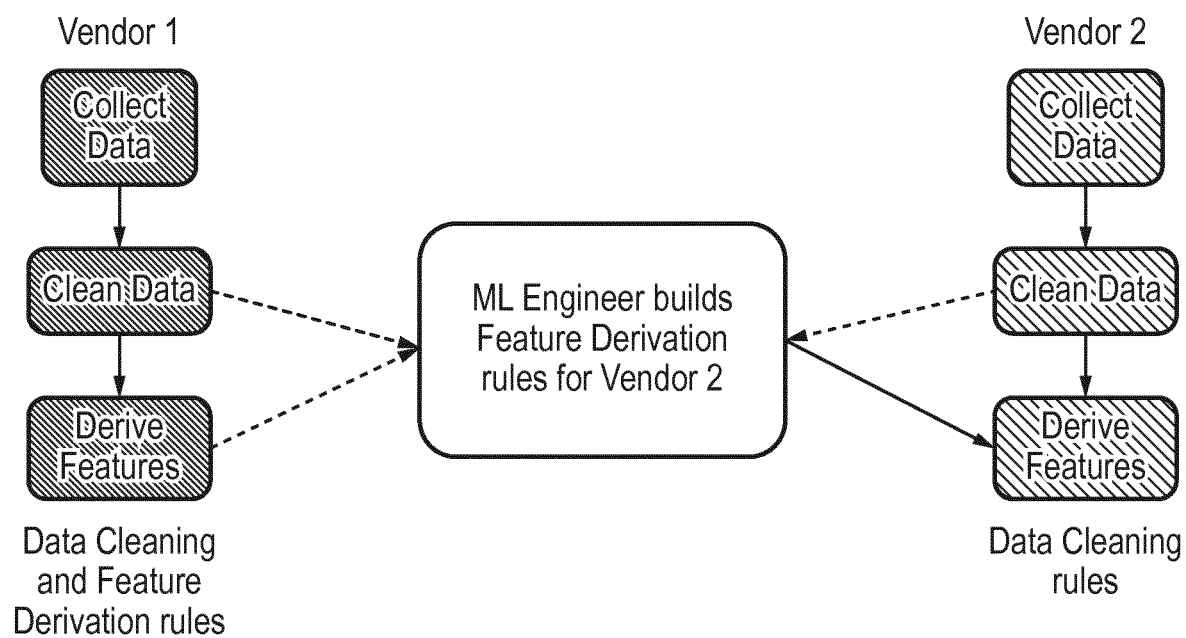
FIG. 8 illustrates a process for additional feature identification.

The processes discussed above seek to identify common data items across vendor products. If those data items are used directly as features by the model, then the appropriate data cleaning and feature derivation rules have been discovered. However, additional processing may be appropriate in order to combine data items and enrich them with other data. For example, several data items many be used together to compute a Key Performance Indicator (KPI), which KPI may be used by the model. One example implementation of this is illustrated in FIG. 8. In FIG. 8 it is assumed that relevant features have been identified for Vendor 1 along with the rules to derive these features from cleaned data. A Machine Learning Engineer may then use the following inputs to identify patterns in cleaned data for Vendor 2 that correspond to the features already developed for vendor 1:
Groupings of similar columns/tags between Vendors 1 and 2
Vendor 1 rules for deriving additional features
The ML Engineer may examines the above inputs and creates rules to derive additional features for Vendor 2.

Figure 9:
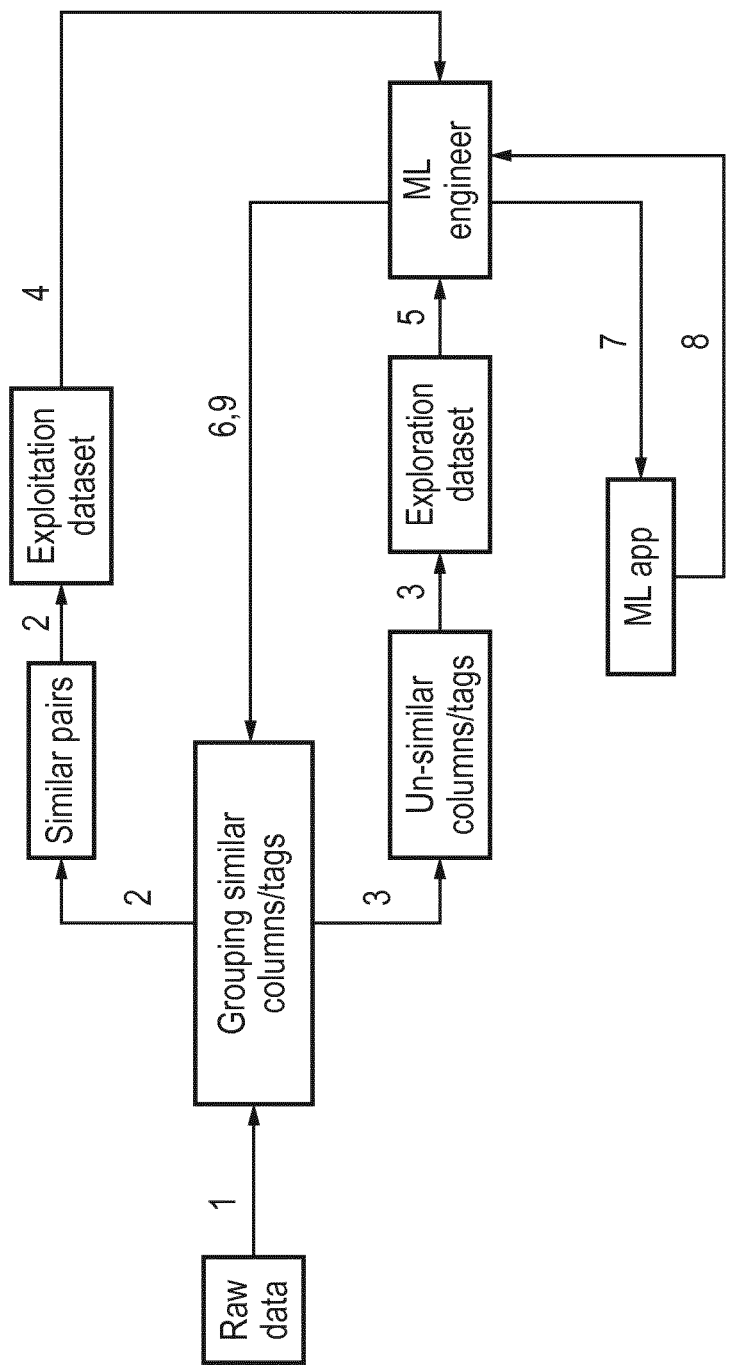
FIG. 9 illustrates process flow according to an implementation of a method for managing network data in a telecommunication network.

FIG. 9 is a systematic representation of a process flow according to one example implementation of methods according to the present disclosure.

Step 1:
  Obtain datasets and metadata for each column of each vendor.
  Run pairwise similarity (e.g., using Chi2) or calculate Euclidean distance and perform clustering.
  Group features from different dataset into normalized network features according to the clustering.

Step 2:
  For data from the datasets that was successfully grouped: move the data to an exploitation dataset.

Step 3:
  For data from the datasets that was not successfully grouped into a normalized network feature: move the data to an exploration dataset for additional investigation and supervision.

Step 4:
  The features are ready to be consumed by the model, or ML application. Inform the ML engineer of the index of each feature. ML engineer may perform additional feature derivation.

Step 5:
  Send data from the exploration dataset to the ML engineer for further investigation, Step 6:
  Manual labelling of any wrongly grouped similar columns as detected by the ML engineer, together with columns from the exploration dataset (i.e. that were not found to be similar to any other columns). Feedback from the ML engineer to the grouping component such that the grouping is enhanced for the corresponding vendors, and any mistakes are not repeated.

Step 7:
  Confirmation of grouping and features by the ML engineer and tuning of the ML application to be able to consume the correct features.

Step 8:
  Monitor performance of the ML application during live deployment (continuous monitored) and action by the ML engineer to improve or amend manual labelling and feature selection (Step 6) if the real-life performance of the ML application does not match the expected performance, for example when compared to performance during a development phase.

Step 9:
  Feedback to the grouping component on the basis of the monitored performance of the ML application.

The following example use case is based on alarm log data from a live project.

The use case involves three different datasets from three different vendors. The data types of the columns from the first to the last index are as follows:

Snapshots from Datasets:

The below snapshot data is obfuscated, where L and d stands for a letter and a digit, respectively.

Dataset1:
Sample row:
array([['Site Index=dddd, Cell Index=dddd, Alarm Cause=Other causes, Site Type=eGBTS, Site Name=GSM-LLdddd, Cell Name=ABddddL, Cell CGI=ddd-dd-ddl-dddl, Local Cell ID=1 LLDDDD Vendor probe@dd.dd.dd:dddd', 'GSM Cell out of Service', dddddddd, 'YYYY-mm-DD HH:MM:ss', 4.0, 'LLdddd']], dtype=object)
Data types: Unicode, Unicode, Int64, Unicode, Unicode, String Dataset2:
Sample row:
array(['UMTS Cell Unavailable', 'RNC ID=ddd, Cell ID=ddddd, Cell Name=Ldd-LLdddd-dL, NodeB ID=dddd, NodeB Name=Ldd-LLdddd, Local Cell ID=d, Alarm Cause=Cell removed (NBAP audit). LLdddd Vendor probe@dd.dd.d.d:dddd', 'LLdddd', 'YYYY-mm-dd HH:MM:ss'], dtype=object)
Data types: Unicode, Unicode, String, Unicode Dataset3:
Sample row:
array([['UMTS Cell Unavailable', 'LLdddd', 'YYYY-mm-dd HH:MM:ss', 4.0, ddddddd]], dtype=object)
Data types: Unicode, String, Unicode, Unicode, Int64

An example matrix of feature description vectors I presented below (see for example step 530 of FIG. 5):

| Vendor, FeatureIndex, [VendorFeatureDescriptiveVector] |
| --- |
| 'vendor1', '0', [118.435, 125.5, 33.0, 230.0, 0.0, 0.0, 0.0, 0.0], |
| 'vendor1', '1', [28.38, 21.0, 5.0, 50.0, 0.0, 0.0, 0.0, 0.0], |
| 'vendor1', '2'[8.365, 8.0, 8.0, 9.0, 335243447.425, 72669538.5, 19430639.0, 831249478.0], |
| 'vendor1', '3', [19.0, 19.0, 19.0, 19.0, 0.0, 0.0, 0.0, 0.0], |
| 'vendor1', '4', [3.0, 3.0, 3.0, 3.0, 0.57, 0.0, 0.0, 5.0], |
| 'vendor1', '5', [6.0, 6.0, 6.0, 6.0, 0.0, 0.0, 0.0, 0.0], |
| 'vendor2', '0', [28.5, 21.0, 7.0, 50.0, 0.0, 0.0, 0.0, 0.0], |
| 'vendor2', '1', [119.92, 130.0, 33.0, 230.0, 0.0, 0.0, 0.0, 0.0], |
| 'vendor2', '2', [6.0, 6.0, 6.0, 6.0, 0.0, 0.0, 0.0, 0.0], |
| 'vendor2', '3', [19.0, 19.0, 19.0, 19.0, 0.0, 0.0, 0.0, 0.0], |
| 'vendor3', '0', [27.87, 21.0, 9.0, 50.0, 0.0, 0.0, 0.0, 0.0], |
| 'vendor3', '1', [6.0, 6.0, 6.0, 6.0, 0.0, 0.0, 0.0, 0.0], |
| 'vendor3', '2', [19.0, 19.0, 19.0, 19.0, 0.0, 0.0, 0.0, 0.0], |
| 'vendor3', '3', [3.0, 3.0, 3.0, 3.0, 0.32, 0.0, 0.0, 5.0], |
| 'vendor3', '4', [8.305, 8.0, 8.0, 9.0, 296870392.605, 72641040.0, 19473949.0, 831253985.0] |

Figure 10:
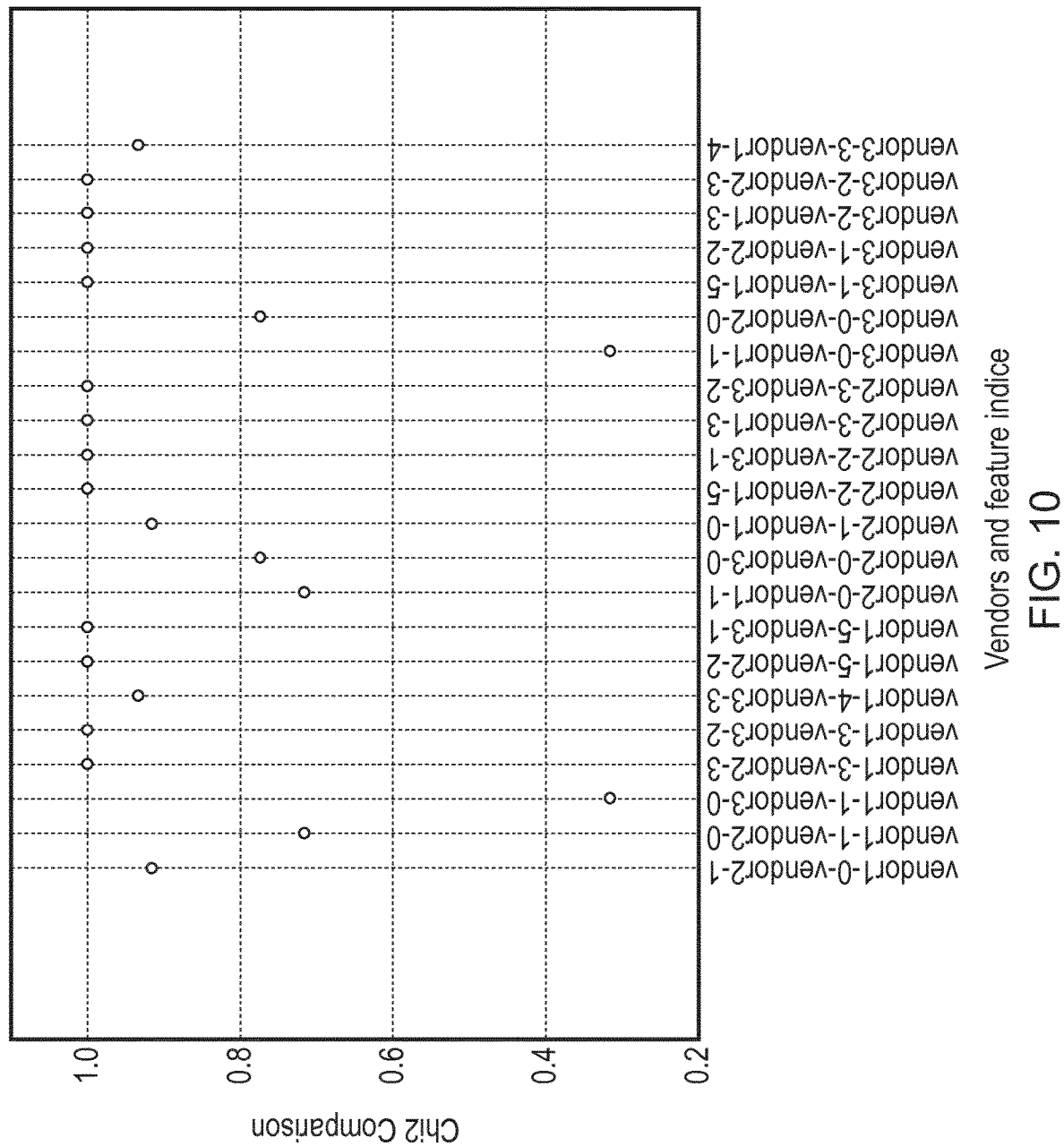
FIG. 10 is a graph of pairwise similarity for feature pairs.

The Chi-squared values between pairs of features, based on the above feature description vectors, are represented in FIG. 10, in which pairs having a Ch-squared value of less than 0.01 are filtered out (this threshold having been chosen as the minimum value indicating some degree of similarity).

Figure 11:
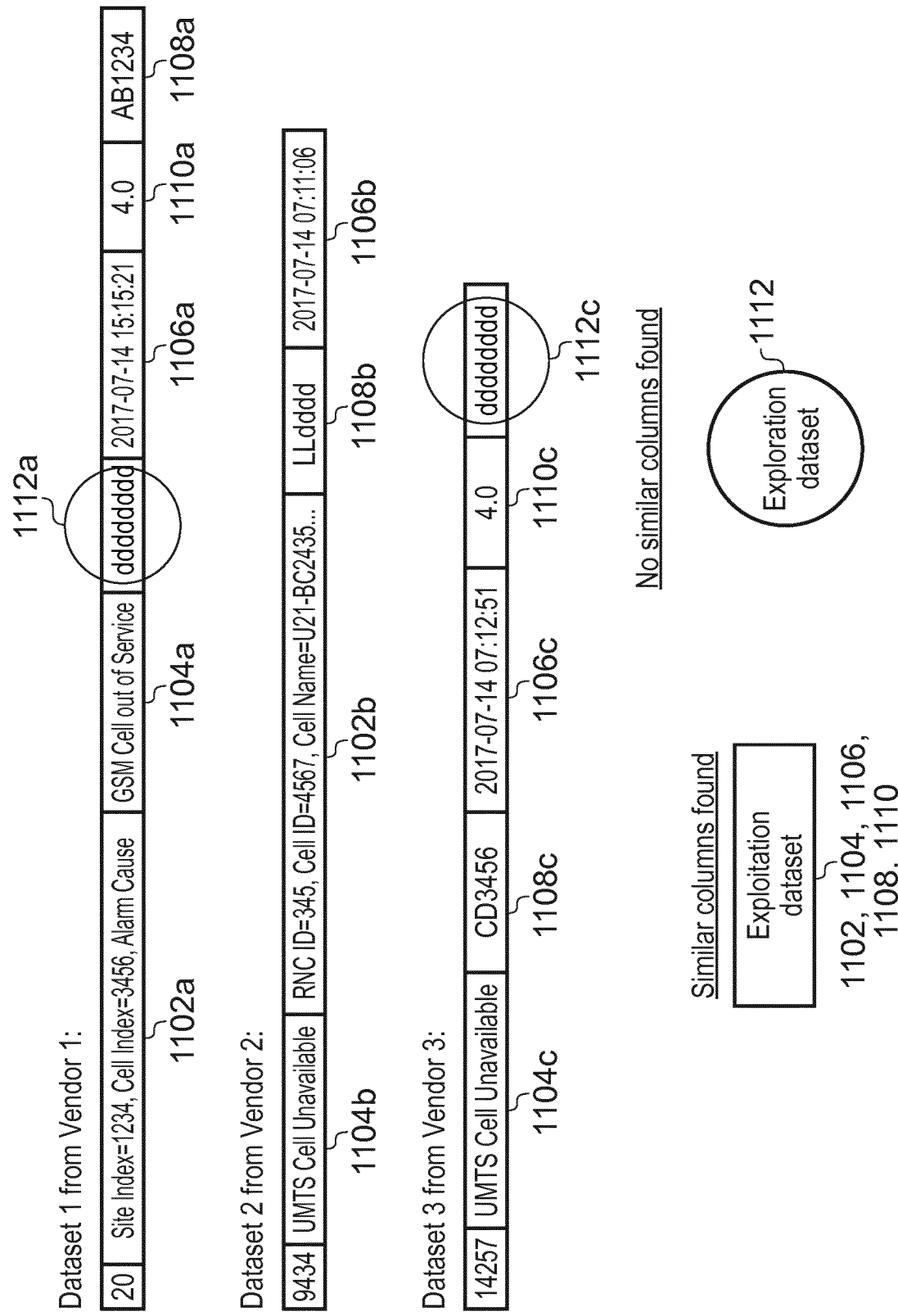
FIG. 11 illustrates an example use case of a method for managing network data in a telecommunication network.

The feature pairs are monitored by taking random samples from each dataset from the three vendors. By matching the results obtained to the dataset columns, those columns found to be highly similar (on the basis of the Ch-squared values) may be labelled accordingly. The data columns that are found to be similar are highlighted in FIG. 11 and below:

| Vendor 1 | Vendor 2 | Vendor 3 |
| --- | --- | --- |
| 1102a | 1102b | |
| 1104a | 1104b | 1104c |
| 1106a | 1106b | 1106c |
| 1108a | 1108b | 1108c |
| 1110a | | 1110c |

All the correctly grouped dataset columns are sent to the exploitation dataset. Columns 1112*a* and 1112*c* were not grouped and so are sent to the exploration dataset for further investigation, which may enable fins tuning of the grouping algorithm.

Figure 12:
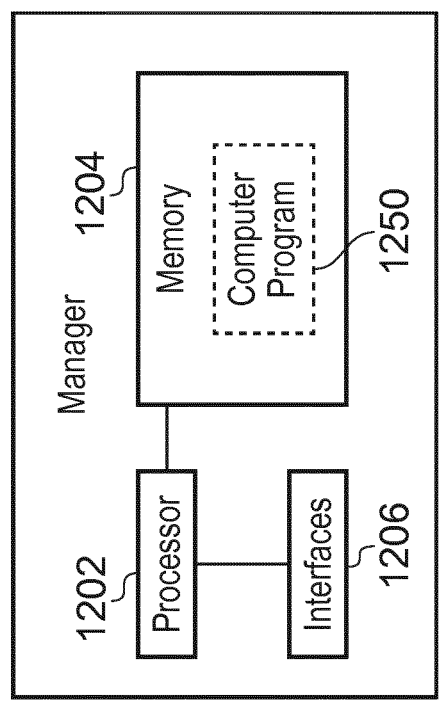
FIG. 12 is a block diagram illustrating functional units in a manager.

As discussed above, the methods 300, 500 may be performed by a manager, which may be a physical node or a Virtualised Network Function, for example running in a cloud deployment. FIG. 12 is a block diagram illustrating an example manager 1200 which may implement the methods 300, 500 according to examples of the present disclosure, for example on receipt of suitable instructions from a computer program 1250. Referring to FIG. 12, the manager 1200 comprises a processor or processing circuitry 1202, a memory 1204 and interfaces 1206. The memory 1204 contains instructions executable by the processor 1202 such that the manager 1200 is operative to conduct some or all of the steps of the method 300 and/or 500. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

Figure 13:
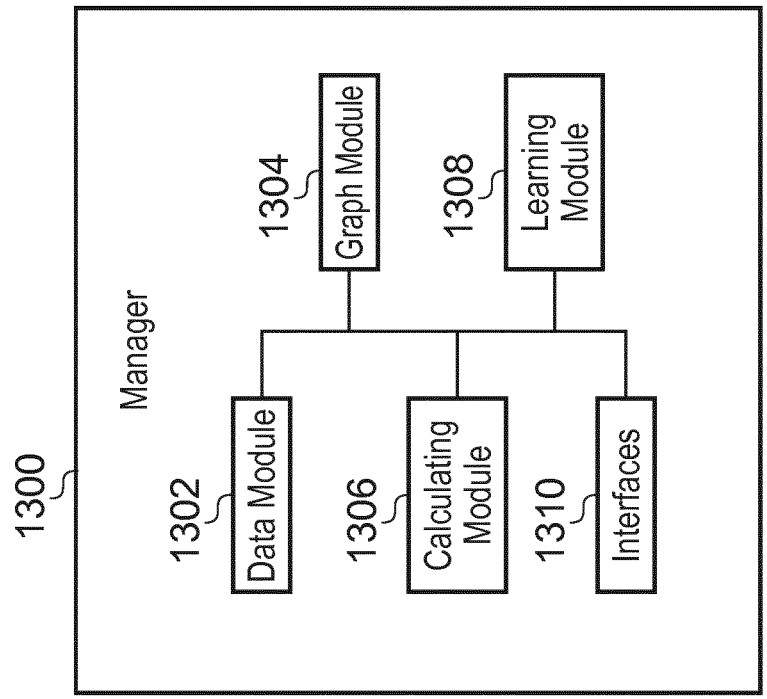
FIG. 13 is a block diagram illustrating functional units in another example of manager.

FIG. 13 illustrates functional modules in another example of manager 1300 which may execute examples of the methods 300, 500 of the present disclosure, for example according to computer readable instructions received from a computer program. It will be understood that the modules illustrated in FIG. 13 are functional modules, and may be realised in any appropriate combination of hardware and/or software. The modules may comprise one or more processors and may be integrated to any degree.

Referring to FIG. 13, the manager 1300 is for managing network event data in a telecommunication network, wherein the network event data is associated with products provided by different vendors. The manager 1300 comprises a data module 1302 for obtaining a plurality of datasets, wherein each dataset comprises network event data associated with products provided by a single vendor, and wherein each dataset comprises a plurality of data instances representing a plurality of network event features. The data module is also for obtaining metadata describing the network event data in the datasets. The manager further comprises a calculating module 1306 for generating, for individual network event features represented in the datasets, a feature description vector from the obtained metadata and for calculating, on the basis of the generated feature description vectors, a metric of the relation between network event features represented in the datasets. The manager further comprises a graph module 1304 for constructing a graph of the network event features represented in the datasets, wherein edges between the network event features are weighted according to the calculated metric, and for partitioning the graph into clusters by minimising an edge cut between network event features. The manager further comprises a learning module 1308 for labelling, for individual clusters in the graph, network event features in the cluster with a normalised network event feature index, which index is unique to the cluster and corresponds to a specific normalised network event feature. The learning module 1308 is also for inputting the network event data representing the labelled network event features to a model for making at least one of recommendations or predictions based on input data representing normalised network event features. The manager 1300 further comprises interfaces 1310. The term module may have conventional meaning in the field of electronics, electrical devices and/or electronic devices and may include, for example, electrical and/or electronic circuitry, devices, processors, processing circuitry, memories, logic, solid state and/or discrete devices, computer programs or instructions for carrying out respective tasks, procedures, computations, outputs, and/or displaying functions, and so on, as such as those that are described in the present disclosure.

Aspects and examples of the present disclosure thus provide methods for managing telecommunication network data such that network data from different vendors may be labelled with normalized network event feature indexes and input to a model for making at least one of a recommendation or a prediction on the basis of the input data. It will be appreciated that while the normalizing of data may take place in a variety of technical fields, in the field of telecommunication networks, the scale and complexity of network event data render the task of normalizing such data between vendors extremely complicated. For example, any one vendor may be associated with many thousands of unique network event features, each with their own syntax, data structure etc. Identifying data fields containing the same or similar or related data for different vendors is thus a highly complex task. Examples of the present disclosure address this task using a graph based on a metric of the relation between network event features in different datasets, wherein the network event features are represented by obtained metadata. The graph is partitioned by minimizing an edge cut, to obtain clusters of highly related network event features from different datasets, allowing those features to be labelled with normalized network event feature indexes. Manual feedback may enhance the operation of the methods. Examples of the present disclosure may enable ML applications developed for one vendor to be reused for data from different vendor, thus providing significant efficiencies of time and other resources by avoiding the need to develop dedicated ML applications for each vendor.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing network event data in a telecommunication network, the network event data being associated with products provided by different vendors, the method comprising:
obtaining a plurality of datasets, each dataset comprising network event data associated with products provided by a single vendor, and each dataset comprising a plurality of data instances representing a plurality of network event features;

obtaining metadata describing the network event data in the datasets;

for individual network event features represented in the datasets, generating a feature description vector from the obtained metadata;

calculating, on the basis of the generated feature description vectors, a metric of the relation between network event features represented in the datasets, the calculating comprising computing a pairwise similarity between the feature description vectors of the network event features represented in the datasets;

constructing a graph of the network event features represented in the datasets, wherein edges between the network event features are weighted according to the calculated metric;

partitioning the graph into clusters by minimising an edge cut between network event features;

for individual clusters in the graph, labelling network event features in the cluster with a normalised network event feature index, which index is unique to the cluster and corresponds to a specific normalised network event feature; and inputting the network event data representing the labelled network event features to a model for making at least one of recommendations or predictions based on input data representing normalised network event features.

2. The method as claimed in claim 1, wherein obtaining metadata describing the network event data in the datasets comprises, for a column of network data instances representing a network event feature, at least one of:

determining a classification of the data instances in the column, wherein the classification comprises at least one of categorical data, continuous numerical data, discrete numerical data;

determining a data type of the data instances in the column;

determining a granularity of the data instances in the column; and generating a statistical representation of the data instances in the column.

3. The method as claimed in claim 2, wherein generating a statistical representation of the data instances in the column comprises generating at least one of a distribution of the data instances in the column, or a count of the number of data instances in the column.

4. The method as claimed in claim 2, wherein generating a statistical representation of the data instances in the column comprises, for a column of numerical data instances:

calculating at least one of:
 maximum value;
 minimum value;
 standard deviation;
 percentiles;
 mean value;
 medial value; and
 mode value,
of the data instances in the column.

5. The method as claimed in claim 2, wherein generating a statistical representation of the data instances in the column comprises, for a column of string data instances:

calculating at least one of:
 maximum string length;
 minimum string length;
 mean string length; and
 median string length,
of the data instances in the column.

6. The method as claimed in claim 2, wherein generating a statistical representation of the data instances in the column comprises, for a column of timestamp data instances:

calculating the distribution of the data instances with respect to the timestamps.

7. The method as claimed in claim 2, wherein generating a statistical representation of the data instances in the column comprises, for a column of non-string data instances:

converting the data instances to data type string; and
performing the steps of claim 5.

8. The method as claimed in claim 1, wherein, for individual network event features represented in the datasets, generating a feature description vector from the obtained metadata comprises:

selecting at least some of the obtained metadata; and
writing the selected metadata into a feature description vector.

9. The method as claimed in claim 1, wherein computing a pairwise similarity between the network event features represented in the datasets comprises:

computing the exponential chi-squared kernel in a pairwise manner for the feature description vectors of network event features represented in the datasets.

10. The method as claimed in claim 1, further comprising:
filtering pairs of network event features represented in the datasets on the basis of the calculated metric; and wherein constructing a graph of the network event features represented in the datasets comprises forming an edge between a pair of network event features if the pair of network event features has been maintained after filtering.

11. The method as claimed in claim 1, further comprising:
removing edges from the constructed graph according to a criterion before partitioning the graph into clusters.

12. The method as claimed in claim 11, wherein the criterion comprises at least one of:

for a network event feature, maintaining only the K strongest weighted edges to other network event features; or maintaining only those edges over a threshold value.

13. The method as claimed in claim 1, wherein partitioning the graph into clusters by minimising an edge cut between network event features comprises:

minimising the sum of the edge weights between clusters.

14. The method as claimed in claim 1, wherein partitioning the graph into clusters by minimising an edge cut between network event features comprises:

calculating the ratio of variances of a pair of network event features joined by an edge;

calculating a combined measure for edges in the graph as a combination of the edge weight and an inverse of the ratio of variances; and minimising the sum of the combined measures between clusters.

15. The method as claimed in claim 1, further comprising:
aggregating clusters based on at least one of Relative Interconnectivity or Relative Closeness before labelling network event features.

16. The method as claimed in claim 15, wherein Relative Interconnectivity is calculated according to:

$$RI(C_i, C_j) = \frac{|EC(C_i, C_j)|}{\frac{|EC(C_i)| + |EC(C_j)|}{2}}$$

where:
EC($C_i$,$C_j$) is the sum of the edge weights between clusters i and j; and
EC($C_i$) is the sum of the edge weights between $C_i$ and all other clusters.

17. The method as claimed in claim 15, wherein Relative Closeness is calculated according to:

$$RC(C_i, C_j) = \frac{SEC(C_i, C_j)}{\frac{|C_i|}{|C_i|+|C_j|}SEC(C_i) + \frac{|C_j|}{|C_i|+|C_j|}SEC(C_i)}$$

where:
SEC(Ci,Cj) is the average weights of the edges that connect vertices in Ci to vertices in Cj
SEC($C_1$) is the average weights of the edges that belong in the min-cut bisector of clusters Ci
|Ci| is the number of edges that connect the vertices in cluster Ci.

18. A manager for managing network event data in a telecommunication network, the network event data being associated with products provided by different vendors, the manager comprising a processor and a memory, the memory containing instructions executable by the processor such that the manager is configured to:
- obtain a plurality of datasets, each dataset comprising network event data associated with products provided by a single vendor, and each dataset comprising a plurality of data instances representing a plurality of network event features;
- obtain metadata describing the network event data in the datasets;
- for individual network event features represented in the datasets, generate a feature description vector from the obtained metadata;
- calculate, on the basis of the generated feature description vectors, a metric of the relation between network event features represented in the datasets, the calculating comprising computing a pairwise similarity between the feature description vectors of the network event features represented in the datasets;
- construct a graph of the network event features represented in the datasets, wherein edges between the network event features being weighted according to the calculated metric;
- partition the graph into clusters by minimising an edge cut between network event features;
- for individual clusters in the graph, label network event features in the cluster with a normalised network event feature index, which index is unique to the cluster and corresponds to a specific normalised network event feature; and
- input the network event data representing the labelled network event features to a model for making at least one of recommendations or predictions based on input data representing normalised network event features.

19. The manager as claimed in claim 18, wherein obtaining metadata describing the network event data in the datasets comprises, for a column of network data instances representing a network event feature, at least one of:
- determining a classification of the data instances in the column, wherein the classification comprises at least one of categorical data, continuous numerical data, discrete numerical data;
- determining a data type of the data instances in the column;
- determining a granularity of the data instances in the column; and
- generating a statistical representation of the data instances in the column.

\* \* \* \* \*